(12) United States Patent
Mukherjee et al.

(10) Patent No.: US 10,666,869 B2
(45) Date of Patent: *May 26, 2020

(54) IMAGE DISPLAY APPARATUS AND IMAGE DISPLAY METHOD

(71) Applicant: Samsung Electronics Co., Ltd., Suwon-si, Gyeonggi-do (KR)

(72) Inventors: Debayan Mukherjee, Bangalore (IN); Swadha Jaiswal, Bangalore (IN); Saumitri Choudhury, Bangalore (IN); Akhilesh Parmar, Bangalore (IN); Anuj Kumar, Bangalore (IN); Rahul Kumar Chaurasia, Bangalore (IN); Ravi Prasad Mohan Kini, Bangalore (IN); Sujata Prabhakar Shidhaye, Bangalore (IN); Karishma Das, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/153,110

(22) Filed: Oct. 5, 2018

(65) Prior Publication Data

US 2019/0045130 A1    Feb. 7, 2019

Related U.S. Application Data

(63) Continuation of application No. 14/846,208, filed on Sep. 4, 2015, now Pat. No. 10,129,481.

(30) Foreign Application Priority Data

Sep. 4, 2014 (IN) ............................ 4353/CHE/2014
Sep. 2, 2015 (KR) ........................ 10-2015-0124233

(51) Int. Cl.
H04N 5/232 (2006.01)

(52) U.S. Cl.
CPC ..... *H04N 5/23293* (2013.01); *H04N 5/23216* (2013.01); *H04N 5/23219* (2013.01)

(58) Field of Classification Search
CPC ............... H04N 5/232; H04N 5/23293; H04N 5/23216; H04N 5/23206; H04N 5/23219;
(Continued)

(56) References Cited

U.S. PATENT DOCUMENTS 8,799,277 B2    8/2014  Park et al.
8,880,528 B2 *  11/2014 Houston ................. G06F 16/22
                                                          707/737

(Continued)

FOREIGN PATENT DOCUMENTS

KR    10-2009-0080272 A    7/2009

OTHER PUBLICATIONS

European Search Report dated Apr. 16, 2018, issued in European Patent Application No. 15839008.8.

*Primary Examiner* — Pritham D Prabhakher
(74) *Attorney, Agent, or Firm* — Jefferson IP Law, LLP

(57) ABSTRACT

An image display method is provided. The image display method includes displaying a camera preview screen that provides an image of a subject in real time, capturing one or more images by capturing the camera preview screen, and displaying a photo reel on the camera preview screen, the photo reel being generated by arranging thumbnails of the captured one or more images in a row.

16 Claims, 35 Drawing Sheets

(58) Field of Classification Search
CPC .......... H04N 1/00209; H04N 1/00212; H04N
1/00307; H04N 2201/3273; H04N
2201/0084; H04N 2201/3205; H04N
2201/3225; H04N 2101/00; G06Q 10/10;
G06Q 50/01; G06K 9/00711; G06K
9/00288; G06K 9/52; G06F 17/3079;
G06F 17/30864; G06F 17/30265; G06F
3/0485; G06F 3/0482; G06F 3/0484;
G06F 3/048; G06F 3/04817; Y10S
707/914; Y10S 707/915; G06T 3/4038;
G06T 11/60; H04M 1/7253; H04M 1/576;
H04M 2250/52
USPC .................................................. 348/333.11
See application file for complete search history.

(56) References Cited

U.S. PATENT DOCUMENTS

| | | | |
|---|---|---|---|
| 8,963,962 B2* | 2/2015 | Ubillos | H04L 51/24 |
| | | | 345/661 |
| 9,152,849 B2 | 10/2015 | Ganong et al. | |
| 9,251,202 B1 | 2/2016 | Uszkoreit et al. | |
| 9,286,641 B2 | 3/2016 | Bosworth et al. | |
| 9,363,579 B2 | 6/2016 | Frumar et al. | |
| 9,369,662 B2* | 6/2016 | Lammers | H04N 5/76 |
| 9,495,583 B2 | 11/2016 | Gilley et al. | |
| 9,530,046 B2 | 12/2016 | Lee et al. | |
| 9,619,108 B2 | 4/2017 | Dowd | |
| 9,639,740 B2* | 5/2017 | Ganong | G06K 9/00677 |
| 2008/0112621 A1 | 5/2008 | Gallagher et al. | |
| 2009/0077497 A1* | 3/2009 | Cho | G06F 3/04817 |
| | | | 715/814 |
| 2009/0083668 A1 | 3/2009 | Aizawa et al. | |
| 2010/0150520 A1 | 6/2010 | Hopwood et al. | |
| 2010/0287053 A1 | 11/2010 | Ganong et al. | |
| 2011/0043643 A1 | 2/2011 | Yu et al. | |
| 2011/0267368 A1 | 11/2011 | Casillas et al. | |
| 2012/0076427 A1 | 3/2012 | Hibino et al. | |
| 2012/0147214 A1* | 6/2012 | Iwasaki | H04N 5/44591 |
| | | | 348/231.2 |
| 2012/0185768 A1 | 7/2012 | Dowd | |
| 2012/0198386 A1 | 8/2012 | Hautala | |
| 2013/0104080 A1 | 4/2013 | Bosworth et al. | |
| 2013/0117692 A1 | 5/2013 | Padmanabhan et al. | |
| 2013/0132901 A1 | 5/2013 | Lee | |
| 2013/0239063 A1* | 9/2013 | Ubillos | H04L 51/24 |
| | | | 715/838 |
| 2013/0310011 A1 | 11/2013 | Kim et al. | |
| 2013/0330019 A1 | 12/2013 | Kim et al. | |
| 2014/0071160 A1 | 3/2014 | Sugiura et al. | |
| 2014/0071323 A1 | 3/2014 | Yi et al. | |
| 2014/0129980 A1 | 5/2014 | Lee | |
| 2014/0143725 A1 | 5/2014 | Lee | |
| 2014/0181089 A1* | 6/2014 | Desmond | G06F 16/907 |
| | | | 707/722 |
| 2014/0181157 A1* | 6/2014 | Houston | G06F 16/22 |
| | | | 707/812 |
| 2014/0211065 A1 | 7/2014 | Sudheendra et al. | |
| 2014/0226053 A1 | 8/2014 | Winer et al. | |
| 2014/0258919 A1 | 9/2014 | Peng et al. | |
| 2014/0317480 A1* | 10/2014 | Chau | G11B 27/036 |
| | | | 715/202 |
| 2014/0320697 A1* | 10/2014 | Lammers | H04N 5/76 |
| | | | 348/231.99 |
| 2014/0351763 A1 | 11/2014 | Lee et al. | |
| 2015/0015763 A1 | 1/2015 | Lee et al. | |
| 2015/0033150 A1 | 1/2015 | Lee et al. | |
| 2015/0067588 A1 | 3/2015 | Shim et al. | |
| 2015/0078732 A1 | 3/2015 | Shakib et al. | |
| 2015/0131872 A1* | 5/2015 | Ganong | G06K 9/00677 |
| | | | 382/118 |
| 2015/0177937 A1 | 6/2015 | Poletto et al. | |
| 2015/0177954 A1 | 6/2015 | Wei et al. | |
| 2016/0050387 A1 | 2/2016 | Kitahara et al. | |
| 2018/0107660 A1* | 4/2018 | Wang | G06F 16/5854 |

* cited by examiner

IMAGE DISPLAY APPARATUS AND IMAGE DISPLAY METHOD

CROSS-REFERENCE TO RELATED APPLICATION(S)

This application is a continuation application of prior application Ser. No. 14/846,208, filed Sep. 4, 2015, which was based on claimed prioriy under 35 U.S.C. § 119(a) of an Indian patent application number 4353/CHE/2014, filed on Sep. 4, 2014, in the Indian Patent Office and under 35 U.S.C. § 119(a) of a Korean patent application number 10-2015-0124233, filed on Sep. 2, 2015, in the Korean Intellectual Property Office, the disclosure of each of which are incorporated by reference herein in its entirety.

TECHNICAL FIELD

The present disclosure relates to image display apparatuses and image display methods, which are capable of increasing user convenience when images are captured and the captured images are shared.

BACKGROUND

With the developments of communication technologies and the miniaturization of electronic devices, personal terminals have come into wide use. In particular, in recent years, personal portable terminals, such as smart phones or smart tablets, have been widely used. In addition, with the developments of compact camera technologies and display technologies, most smart phones include camera modules and displays.

Most digital cameras also include camera modules and displays. With the developments of digital camera technologies, Android-based digital cameras with a built-in wireless communication module have been introduced. The Android is an operating system that has been widely used for a smart phone. Therefore, users are may capture images with both a smart phone and a digital camera by using a similar method and share the captured images with each other.

The user may capture an image by using an electronic device, such as a smart phone or a digital camera, which includes a camera module and a display. The user may confirm the captured image by using the display included in the electronic device. The user may edit the captured image or share the captured image with friends by using the electronic device.

Specifically, the user may capture at least one or more images by using a camera application installed on the electronic device. The user may capture still images, burst images, or videos according to a capture mode of the camera application. After the capturing of the images has been completed, the user may confirm the captured images by using a gallery application. The user may edit the captured images or share the captured images with friends by using the gallery application or other applications.

If the quality of the captured image is unsatisfactory, the user may execute the camera application again and additionally capture images.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide image display apparatuses and image display methods, which are capable of increasing user convenience when images are captured and the captured images are shared.

Another aspect of the present disclosure is to provide image display apparatuses and image display methods, which are capable of managing or controlling captured images without switching between a camera application and a gallery application.

Another aspect of the present disclosure is to provide image display apparatuses and image display methods, which are capable of easily confirming the qualities of captured images and helping a user determine whether to additionally capture an image.

Another aspect of the present disclosure is to provide image display apparatuses and image display methods, which are capable of enabling a user to easily and quickly share an image captured by the user with persons included in the captured image.

In accordance with an aspect of the present disclosure, an image display method is provided. The image display method includes displaying a camera preview screen that provides an image of a subject in real time, capturing one or more images by capturing the camera preview screen, and displaying a photo reel on the camera preview screen, the photo reel being generated by arranging thumbnails of the captured one or more images in a row.

The displaying of the photo reel on the camera preview screen may include displaying visual marks indicating qualities of the captured one or more images in the photo reel.

The displaying of the visual marks in the photo reel may include determining the qualities of the captured one or more images based on at least one of degree of light exposure of the captured one or more images, resolutions of the captured one or more images, focal positions of the captured one or more images, and sizes of subjects included in the captured one or more images, and displaying thumbnails corresponding to the captured one or more images in different sizes according to the qualities of the captured one or more images.

The image display method may further include receiving a touch input on a first thumbnail among the thumbnails included in the photo reel, and in response to the touch input, displaying an image corresponding to the first thumbnail in full screen, storing the image corresponding to the first thumbnail, excluding the first thumbnail from the photo reel, displaying at least some of the thumbnails included in the photo reel as one stacked group, merging at least some of the captured one or more images into one panoramic image, scrolling the photo reel, or displaying a gallery screen, wherein the touch input includes at least one selected from among a tap input, a drag input, a swipe input, a slide input, a flick input, a pinch input, and a press-and-hold input.

The image display method may further include recognizing subjects included in the captured one or more images through face recognition, displaying tags corresponding to the recognized subjects and a share button on the camera preview screen, and sharing the captured one or more images in response to a touch input on the photo reel, at least one of the thumbnails, at least one of the tags, or the share button.

The tags may include at least one selected from among a name, a nickname, a photo, a symbol, a mark, a word, a phrase, an image, a logo, initials, a user interface, or an icon.

The sharing of the captured one or more images in response to the touch input may include receiving a first touch input on a first tag among the tags, displaying thumbnails of one or more first images, which include a first subject corresponding to the first tag among the captured one or more images, and a confirm button on the camera preview screen in response to the first touch input, and transmitting the one or more first images in response to a second touch input on the confirm button.

The image display method may further include, before the transmitting of the one or more first images displaying a share channel corresponding to the first tag on the camera preview screen in response to the first touch input, and changing the share channel to another share channel in response to a third touch input on the displayed share channel, wherein the transmitting of the one or more first images includes transmitting the one or more first images to the first subject via the share channel in response to a fourth touch input on the confirm button.

The image display method may further include, before the transmitting of the one or more first images, excluding a second image from the one or more first images in response to a fifth touch input on a thumbnail of the second image among the thumbnails of the one or more first images.

The image display method may further include displaying second tags corresponding to subjects included in the one or more first images on the camera preview screen in response to the first touch input, wherein the transmitting of the one or more first images includes transmitting the one or more first images to the subjects included in the one or more first images in response to a sixth touch input on the confirm button.

The image display method may further include, before the transmitting of the one or more first images, excluding images, which include a subject corresponding to a third tag among the one or more first images, from the one or more first images in response to a seventh touch input on the third tag different from the first tag among the displayed tags.

The image display method may further include, after the excluding of the images, which include the subject corresponding to the third tag, from the one or more first images and before the transmitting of the one or more first images, adding the excluded images to the one or more first images in response to an eighth touch input on the third tag.

The image display method may further include, before the transmitting of the one or more first images, excluding images, which do not include a subject corresponding to a fourth tag among the one or more first images, from the one or more first images in response to a ninth touch input on the fourth tag different from the first tag among the displayed tags.

The image display method may further include, after the excluding of the images, which do not include the subject corresponding to the fourth tag, from the one or more first images and before the transmitting of the one or more first images, adding the excluded images to the one or more first images in response to a tenth touch input on the fourth tag.

The sharing of the captured one or more images in response to the touch input may include receiving the touch input on the share button, displaying a confirm button on the camera preview screen in response to the touch input, setting images corresponding to the recognized subjects among the captured one or more images as a share image, setting subjects corresponding to the tags as one or more share targets, and transmitting the one or more share images to the share target in response to a touch input on the confirm button.

The image display method may further include, before the transmitting of the one or more share images to the share target adding or excluding an image corresponding to a first thumbnail to or from the one or more share images in response to a touch input on the first thumbnail among the thumbnails, and adding or excluding an image corresponding to a first tag to or from the share target in response to a touch input on the first tag among the thumbnails.

The image display method may further include, before the transmitting of the one or more share images to the share target displaying a first share channel corresponding to at least one of the tags on the camera preview screen in response to the touch input, and changing the first share channel to another share channel in response to a touch input on the first share channel, wherein the transmitting of the one or more share images to the share target includes transmitting the one or more share images to the share target via the first share channel in response to the touch input on the confirm button.

The image display method may further include, before the transmitting of the one or more share images to the share target displaying a contact list and second share channels corresponding to contacts included in the contact list on the camera preview screen in response to the touch input, adding or excluding a first contact to or from the share target in response to a touch input on the first contact included in the contact list, and changing the second share channel to another share channel in response to a touch input on the second share channel, wherein the transmitting of the one or more share images to the share target includes transmitting the one or more share images to the share target via the second share channels in response to the touch input on the confirm button.

The image display method may further include, before the transmitting of the one or more share images to the share target displaying a list of all share channels on the camera preview screen, and setting a third share channel as an additional share channel or deselecting the third share channel from the additional share channel in response to a touch input on the third share channel included in the list of all of the share channels, wherein the transmitting of the one or more share images to the share target includes transmitting the one or more share images via the additional share channel in response to the touch input on the confirm button.

The sharing of the captured one or more images in response to the touch input may include receiving a touch input on a first thumbnail among the thumbnails, displaying a first image corresponding to the first thumbnail in full screen in response to the touch input, and displaying a first tag corresponding to a subject included in the first image and the share button on the displayed first image, displaying at least one of a first share channel corresponding to the first tag, a contact list, second share channels corresponding to contacts included in the contact list, a list of all share channels, and a confirm button on the displayed first image in response to a touch input on the share button, setting a subject corresponding to the first tag as a share target, and transmitting the first image to the share target via the share channel corresponding to the share target.

The image display method may further include, before the transmitting of the one or more first images to the share target adding or excluding an image corresponding to a second tag to or from the share target in response to a touch input on the second tag among the first tags, changing the first share channel to another share channel in response to a touch input on the first share channel, adding or excluding a first contact to or from the share target in response to a touch input on the first contact included in the contact list, changing the second share channel to another share channel in response to a touch input on the second share channel, and setting a third share channel as an additional share channel or deselecting the third share channel from the additional share channel in response to a touch input on the third share channel included in the list of all of the share channels, wherein the image display method further includes, after the transmitting of the one or more first images to the share target, transmitting the one or more first images via the additional share channel in response to the touch input on the confirm button.

The sharing of the captured one or more images in response to the touch input may include receiving a flick input on the thumbnail, displaying a gallery screen in response to the flick input, displaying a photo reel on the gallery screen in response to a touch input on the gallery screen, the photo reel on the gallery screen being generated by arranging thumbnails of images included in a gallery in a row, recognizing a first subject included in the images included in the gallery through face recognition, displaying a tag corresponding to the first subject and a share button on the gallery screen, and sharing the images included in the gallery in response to a touch input on the thumbnail, the tag corresponding to the first subject, or the share button displayed on the gallery screen.

In accordance with another aspect of the present disclosure, an image display apparatus is provided. The image display apparatus includes a capturing unit configured to receive light reflected from a subject, a display unit configured to display a camera preview screen that provides an image of the subject in real time by using the light received by the capturing unit, an input unit configured to receive an input from a user, a control unit configured to capture one or more images by capturing the camera preview screen according to the input received by the input unit, and a storage unit configured to store the captured one or more images, wherein the display unit displays a photo reel on the camera preview screen, the photo reel being generated by arranging thumbnails of the captured one or more images in a row.

The display unit may be configured to display visual marks indicating qualities of the captured one or more images in the photo reel.

The control unit may be configured determine the qualities of the captured one or more images based on at least one of degree of light exposure of the captured one or more images, resolutions of the captured one or more images, focal positions of the captured one or more images, and sizes of subjects included in the captured one or more images, and the display unit may be configured to display thumbnails corresponding to the captured one or more images in different sizes according to the qualities of the captured one or more images.

The image display apparatus may further include a communication unit configured to transmit at least one of the captured images to the outside, wherein the control unit is configured to recognize a subject included in the captured one or more images through face recognition, the display unit is configured to display at least one of a tag corresponding to the recognized subject and a share button on the camera preview screen, the input unit is configured to receive a touch input on the photo reel, the thumbnails, the tag, or the share button, the control unit is configured to set at least one of the images as one or more share images in response to the touch input, and the communication unit is configured to transmit the one or more share images to the outside.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that, although the terms "first", "second", "third", etc. may be used herein to describe various elements, these elements should not be limited by these terms. These terms are only used to distinguish one element from another. For example, a first element may be referred to as a second element, and similarly, a second element may be referred to as a first element without departing from the scope of protection of the inventive concept.

The terminology used herein is for the purpose of describing particular embodiments only and is not intended to be limiting of the inventive concept. It will also be understood that the terms "comprises", "includes", and "has", when used herein, specify the presence of stated elements, but do not preclude the presence or addition of other elements, unless otherwise defined.

Unless otherwise defined, all terms used in this specification will be construed as general meanings commonly understood by one of ordinary skill in the art. In addition, terms defined in a general dictionary will not be interpreted in an idealized or overly formal sense unless expressly so defined herein.

Hereinafter, an image display apparatus 100 and an image display method, according to various embodiments of the present disclosure, will be described in detail with reference to FIGS. 1 to 35.

Figure 1:
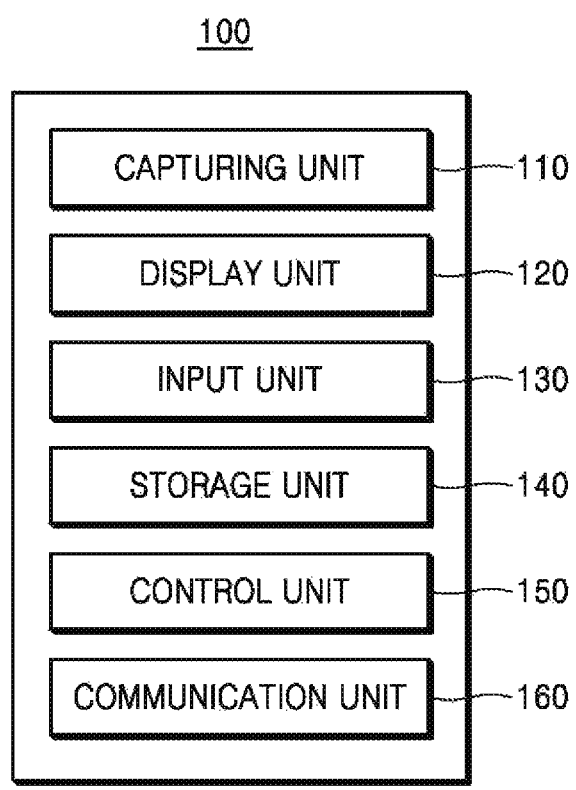
FIG. 1 is a block diagram of an image display apparatus according to an embodiment of the present disclosure.

FIG. 1 is a block diagram of the image display apparatus 100 according to an embodiment of the present disclosure.

Referring to FIG. 1, the image display apparatus 100 may be a laptop computer, a smart phone, a smart tablet, a mobile terminal, a digital camera, or a portable electronic device. Referring to FIG. 1, the image display apparatus 100 may include a capturing unit 110, a display unit 120, an input unit 130, a storage unit 140, a control unit 150, and a communication unit 160.

The capturing unit 110 may receive light reflected from a subject. The capturing unit 110 may capture an image of a subject. The capturing unit 110 may capture a figure of a subject as an image. The capturing unit 110 may capture photos, moving images, still images, burst images, or videos. The capturing unit 110 may include a camera module, a lens, or an optical element.

The display unit 120 may display an image captured by the capturing unit 110. For example, the display unit 120 may display an image of a subject, which is captured by the capturing unit 110, in real time. In other words, the display unit 120 may display a camera preview screen that provides an image of a subject in real time. The display unit 120 may display a screen. The display unit 120 may display a user interface. In addition, the display unit 120 may display another screen in response to a user input.

The display unit 120 may be a flat-panel display device, such as a liquid crystal display (LCD), an organic light emitting diode (OLED), or a plasma display panel (PDP). In addition, the display unit 120 may be a curved display or a flexible display. The display unit 120 and the input unit 130 may be integrally configured like a touch screen, or may be separately configured.

The input unit 130 may receive an external input. The input unit 130 may receive an input from a user of the image display apparatus 100. The input unit 130 may be a button, a touch screen, a track ball, a camera, a keyboard, a mouse, or a fingerprint recognition device.

The input unit 130 may be a touch screen. The input unit 130 may receive a user's touch input. Examples of the user's touch input may include a tap input, a drag input, a swipe input, a slide input, a flick input, and a press-and-hold input.

The storage unit 140 may store the image captured by the capturing unit 110. For example, when a user's touch input is received through the input unit 130 while the camera preview screen is being displayed on the display unit 120, an image corresponding to a time point when the user's touch input has been received may be stored in the storage unit 140 as a still image.

The storage unit 140 may be a volatile memory or a non-volatile memory. The storage unit 140 may be flash memory, read-only memory (ROM), random access memory (RAM), electrically erasable ROM (EEROM), erasable programmable ROM (EPROM), electrically erasable and programmable ROM (EEPROM), hard disk drive (HDD), or register. The storage unit 140 may include a file system, a database, or an embedded database.

The control unit 150 may control the elements of the image display apparatus 100 and the operation of the image display apparatus 100. In addition, the control unit 150 may perform an arithmetic operation. The control unit 150 may perform image processing. For example, the control unit 150 may recognize a subject included in a captured image by performing face recognition on the captured image. The control unit 150 may control the operation of the image display apparatus 100 or control the captured image in response to a user's input.

The control unit 150 may execute an application. The control unit 150 may execute a camera application or a gallery application. The control unit 150 may control the capturing unit 110 and the display unit 120 through the camera application. The control unit 150 may control the capturing unit 110 to capture an image through the camera application. The control unit 150 may control the display unit 120 to display the captured image through the camera application.

The control unit 150 may control the storage unit 140 and the display unit 120 through the gallery application. The control unit 150 may control the display unit 120 to display the image stored in the storage unit through the gallery application.

The control unit 150 may be connected to the elements included in the image display apparatus 100. The control unit 150 may be a central processing unit (CPU) or a microprocessor.

The communication unit 160 may transmit data to the outside or receive data from the outside. The communication unit 160 may transmit at least some of the captured images to the outside. The communication unit 160 may transmit at least some of the captured images in response to a user's input.

The communication unit 160 may include a long-range network interface, such as a third-generation (3G) module, a long-term evolution (LTE) module, a wireless fidelity (Wi-Fi) module, or a local area network (LAN) card. In addition, the communication unit 160 may include a short-range network interface, such as a Bluetooth module, a near-field communication (NFC) module, a radio-frequency (RF) module, or an infrared module. In addition, the communication unit 160 may include other network interfaces.

Figure 2:
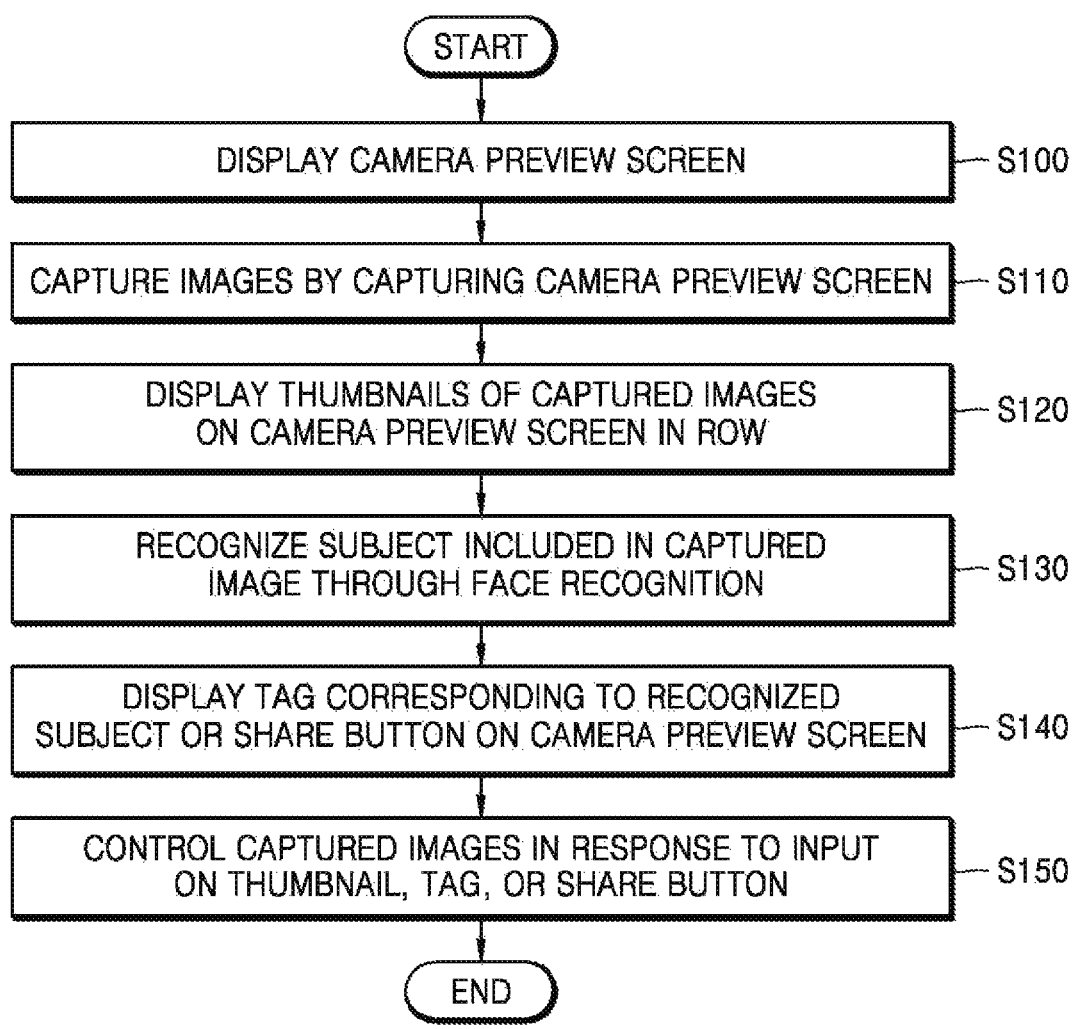
FIG. 2 is a flowchart of an image display method according to an embodiment of the present disclosure.

FIG. 2 is a flowchart of an image display method according to an embodiment of the present disclosure.

Referring to FIG. 2, in operation S100, a camera preview screen that provides an image of a subject in real time may be displayed. For example, the control unit 150 may execute a camera application. The control unit 150 may execute a capture mode of the camera application. In the capture mode, the display unit 120 may display the image of the subject, which is captured by the capturing unit 110, in real time. In other words, the display unit 120 may display the camera preview screen that provides the image of the subject in real time.

Figure 3:
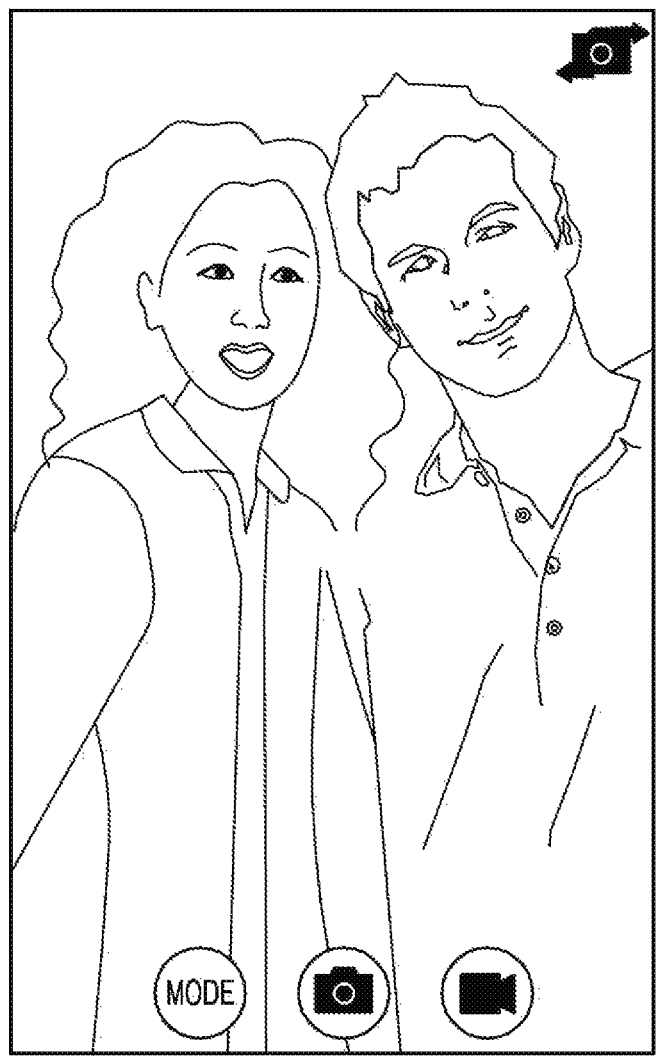
FIG. 3 is a diagram of a camera preview screen displayed on the image display apparatus according to an embodiment of the present disclosure.

FIG. 3 is a diagram of the camera preview screen displayed on the image display apparatus 100 according to an embodiment of the present disclosure.

Referring to FIG. 3, the capturing unit 110 may capture an image of two persons as the subject. The display unit 120 may display the image of the subject, which is captured by the capturing unit 110, in real time. Referring to FIG. 3, the display unit 120 may further display a mode switch button, a still image capture button, a video capture button, or a camera select button on the camera preview screen.

Referring to FIG. 2 again, in operation S110, at least one image may be captured by capturing the camera preview screen. For example, the input unit 130 may receive a user's tap input on the still image capture button from a user. In response to the tap input, the control unit 150 may capture, as a still image, a screen corresponding to a time point when the tap input has been received on the camera preview screen that is being displayed in real time. The storage unit 140 may store the still image.

The input unit 130 may receive a plurality of tap inputs on the still image capture button from the user. Whenever the tap input is received, the control unit 150 may capture a corresponding screen as a still image. Therefore, a plurality of still images may be captured according to a user's input while the camera preview screen is being displayed on the display unit 120.

In addition, the input unit 130 may receive a touch input on the mode switch button from the user. The capture mode may be switched in response to the touch input on the mode switch button. Examples of the capture mode may include a still image capture mode, a burst shot mode, a best shot mode, a self-camera capture mode, and a video capture mode. In response to the touch input on the capture button, the control unit 150 may capture still images, burst images, best shot images, self-camera images, or videos according to the capture mode.

In operation S120, a photo reel may be displayed on the camera preview screen. The photo reel may be generated by arranging thumbnails of the captured images in a row. Whenever the image is captured, the control unit 150 may generate the thumbnail of the captured image. The storage unit 140 may store the generated thumbnails. The display unit 120 may display the generated thumbnails on the camera preview screen that is currently displayed on the display unit 120. For example, the display unit 120 may display newly generated thumbnails on a left lower portion of the display unit 120. In addition, when newly generated thumbnails are present, the display unit 120 may displays the existing thumbnails by shifting to the right from the original positions thereof.

Therefore, when a plurality of images are captured, a plurality of thumbnails may be displayed on the camera preview screen. In addition, the plurality of thumbnails may be displayed in a row in the order of generation time points thereof. A photo reel may be constituted by arranging the plurality of thumbnails in a row as described above.

For example, it is assumed that an image is initially captured in response to a user's input in such a state that the screen as illustrated in FIG. 3 is displayed after a camera application is executed. The control unit 150 may capture an image including two persons illustrated in FIG. 3 and then generate a thumbnail of the image. The display unit 120 may display a photo reel including the thumbnail on the camera preview screen. The display unit 120 may display the thumbnail in a left lower portion thereof.

Figure 4:
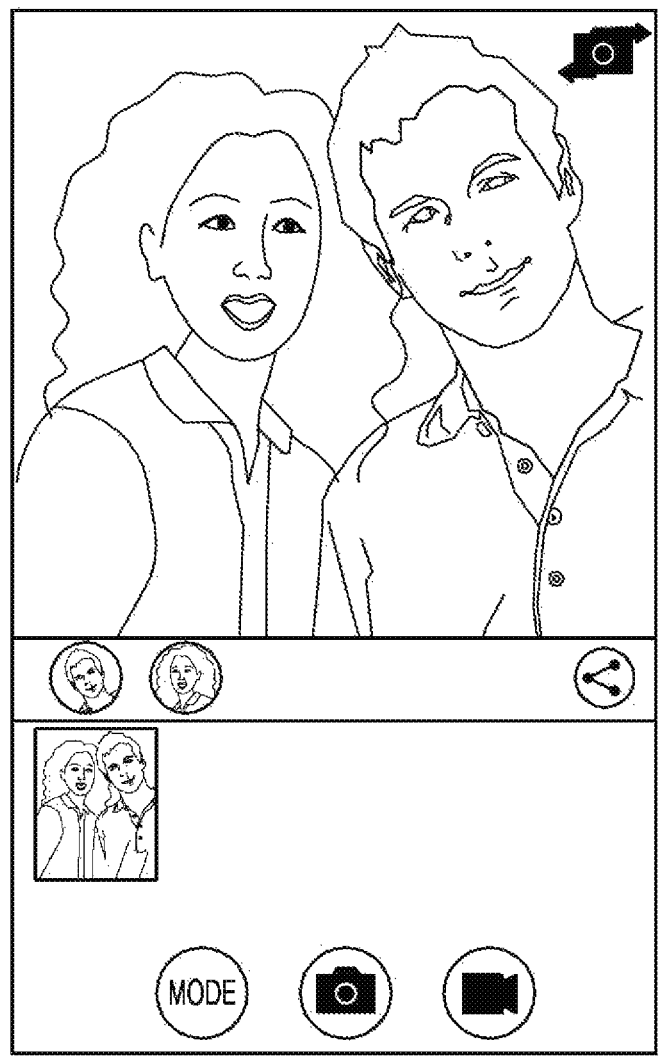
FIG. 4 is a diagram of a screen in a case where a photo reel is displayed on a camera preview screen after one image is captured according to an embodiment of the present disclosure.

FIG. 4 is a diagram of a screen in a case where the photo reel is displayed on the camera preview screen after one image is captured according to an embodiment of the present disclosure.

As another example, it is assumed that a plurality of images are captured in response to a user's input after the camera application is executed. Subjects included in the plurality of images may be identical to or different from one another. In addition, the arrangements of the subjects in the plurality of images may be identical to or different form one another.

Figure 5:
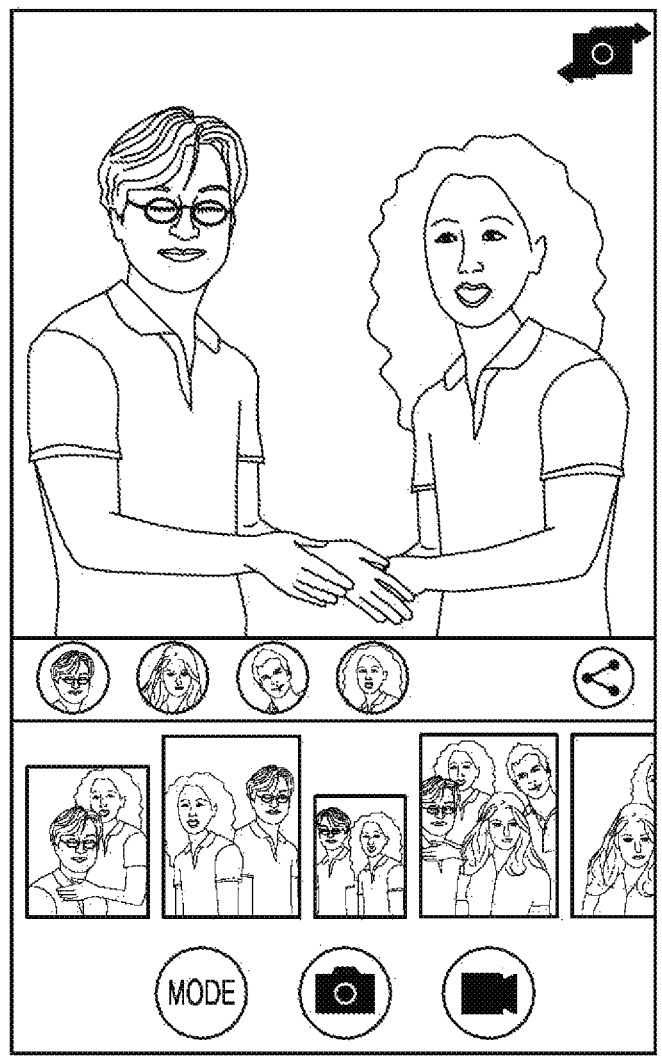
FIG. 5 is a diagram of a screen in a case where a photo reel is displayed on a camera preview screen according to an embodiment of the present disclosure.

FIG. 5 is a diagram of a screen in a case where a photo reel is displayed on a camera preview screen according to an embodiment of the present disclosure.

Referring to FIG. 5, thumbnails respectively corresponding to at least five images captured after the execution of the camera application may be displayed on the camera preview view. Referring to FIG. 5, the thumbnail displayed at the leftmost position may be a thumbnail corresponding to the most recently captured image. In FIG. 5, the thumbnail displayed at the second leftmost position may be a thumbnail corresponding to the second most recently captured image. Referring to FIG. 5, the thumbnail displayed at the third leftmost position may be a thumbnail corresponding to the third most recently captured image.

In addition, whenever the image is captured, the control unit 150 may detect the quality of the captured image. The control unit 150 may determine the quality of the captured image based on at least one of a degree of light exposure of the captured image, a resolution of the captured image, a focal position of the captured image, and a size of a subject included in the captured image.

For example, the control unit 150 may determine that the quality of the captured image is high, when the degree of light exposure of the captured image is appropriate, the resolution of the captured image is high, the focal position of the captured image is appropriate, and the size of the subject included in the captured image is appropriate. On the other hand, the control unit 150 may determine that the quality of the captured image is low, when the degree of light exposure of the captured image is excessively high or excessively low, the resolution of the captured image is excessively low, the focal position of the captured image is out of a normal range, and the size of the subject included in the captured image is excessively large or excessively small.

The sizes of the thumbnails in the photo reel displayed on the display unit 120 may be substantially equal to each other or different from each other. For example, as the quality of the captured image becomes higher, the thumbnail corresponding to the captured image may be displayed in a larger size. In addition, as the quality of the captured image becomes lower, the thumbnail corresponding to the captured image may be displayed in a smaller size. In other words, the size of the displayed thumbnail may be proportional to the quality of the image corresponding to the thumbnail.

For example, referring to FIG. 5, the thumbnail displayed at the leftmost position in the photo reel may be smaller than the thumbnail displayed at the second left most position and larger than the thumbnail displayed at the third leftmost position. Therefore, the quality of the image corresponding to the thumbnail displayed at the leftmost position may be lower than the quality of the image corresponding to the thumbnail displayed at the second leftmost position and higher than the image corresponding to the thumbnail displayed at the third leftmost position.

On the contrary, as the quality of the captured image becomes lower, the thumbnail corresponding to the captured image may be displayed in a larger size. In addition, as the quality of the captured image becomes higher, the thumbnail corresponding to the captured image may be displayed in a smaller size. In other words, the size of the displayed thumbnail may be inversely proportional to the quality of the image corresponding to the thumbnail.

As described above, the image display apparatus 100 may display the thumbnails corresponding to the captured images in different sizes according to the qualities of the captured images. In other words, the image display apparatus 100 may display visual marks indicating the qualities of the captured images through the thumbnails of the captured images. In this way, the user may quickly and easily confirm the quality of the captured image. In addition, the user may intuitively confirm the quality of the captured image.

In addition, the types of the images corresponding to the thumbnails in the photo reel, which is displayed on the display unit 120, may be equal to each other or different from each other.

Figure 6:
FIG. 6 is a diagram of a screen in a case where a photo reel is displayed on a camera preview screen according to an embodiment of the present disclosure.

FIG. 6 is a diagram of a screen in a case where a photo reel is displayed on a camera preview screen according to another embodiment of the present disclosure.

Referring to FIG. 6, an image corresponding to a thumbnail displayed at the leftmost position may be a still image. An image corresponding to a thumbnail displayed at the second leftmost position may be a burst image. An image corresponding to a thumbnail displayed at the third leftmost position may be a still image. An image corresponding to a thumbnail displayed at the fourth leftmost position may be a video.

Therefore, the type of the image corresponding to the thumbnail displayed at the leftmost position may be the same as the type of the image corresponding to the thumbnail displayed at the third leftmost position. In addition, the type of the image corresponding to the thumbnail displayed at the leftmost position may be different from the type of the image corresponding to the thumbnail displayed at the second leftmost position.

Referring to FIG. 2 again, in operation S130, the subject included in the captured image may be recognized through face recognition. Whenever the image is captured, the control unit 150 may performed the face recognition on the captured image. The control unit 150 may recognize the subject included in the captured image by comparing a face of the subject included in the captured image with a database. For example, the control unit 150 may recognize the subject included in the captured image within persons included in a contact list.

The control unit 150 may separately perform the face recognition on each captured image. The subject may not be included in the captured image, only one subject may be included in the captured image, or two or more subjects may be included in the captured image. Therefore, the number of the subjects recognized from one image through the face recognition may be an integer equal to or greater than 0. In addition, subjects included in different images may be the same person or may be different persons. Therefore, the subject recognized from one image may be identical to or different from the subject recognized from another image.

In operation S140, at least one of a tag corresponding to the recognized subject and a share button may be displayed on the camera preview screen. The display unit 120 may display the tag corresponding to the subject recognized from the captured image on the camera preview screen. The tag corresponding to the recognized subject may include a name, a nickname, or a photo of the recognized subject. In addition, the tag may include a symbol, a mark, a word, a phrase, an image, a logo, initials, a user interface, or an icon associated with the recognized subject. The control unit 150 may derive a set of non-overlapped subjects among the entire subjects recognized from the entire captured images. The display unit 120 may display tags corresponding to the subjects included in the derived set in a row. The display unit 120 may display the tags, which are arranged in a row, alongside the photo reel.

In addition, the display unit 120 may display the share button on the camera preview screen. The display unit 120 may display the share button alongside the photo reel.

For example, as illustrated in FIG. 4, the display unit 120 may display icons corresponding to the recognized subjects as the tags. According to the embodiment of the present disclosure illustrated in FIG. 4, the control unit 150 may recognize "Alex" and "Bob" from one captured image through face recognition. The display unit 120 may display an icon corresponding to "Alex" and an ion corresponding to "Bob", respectively, as a tag corresponding to "Alex" and a tag corresponding to "Bob". The display unit 120 may display the tags and the share button arranged in a row alongside the photo reel. A subject corresponding to a tag displayed at the leftmost position in FIG. 4 may be "Bob". A subject corresponding to a tag displayed at the second leftmost position in FIG. 4 may be "Alex".

As another example, as illustrated in FIG. 6, the display unit 120 may display icons corresponding to the recognized subjects as the tags. According to the embodiment of the present disclosure illustrated in FIG. 5, According to the embodiment illustrated in FIG. 5, the control unit 150 may recognize "Alex" and "Don" from an image corresponding to a thumbnail displayed at the leftmost position. Also, the control unit 150 may recognize "Alex", "Bob", "Caren", and "Don" from an image corresponding to a thumbnail displayed at the fourth leftmost position. In addition, the control unit 150 may recognize "Alex" and "Caren" from an image corresponding to a thumbnail displayed at the fifth leftmost position. The control unit 150 may derive a set including "Alex", "Bob", "Caren", and "Don" as a set of non-overlapped subjects among the entire recognized subjects. The display unit 120 may display tags corresponding to the subjects included in the set in a row.

The display unit 120 may display the tags, which are arranged in a row, and the share button alongside the photo reel. In FIG. 6, the subject corresponding to the tag displayed at the leftmost position may be "Don". In FIG. 6, the subject corresponding to the tag displayed at the second leftmost position may be "Caren". In FIG. 6, the subject corresponding to the tag displayed at the third leftmost position may be "Bob". In FIG. 6, the subject corresponding to the tag displayed at the fourth leftmost position may be "Alex".

Referring to FIG. 2 again, in operation S150, the photo reel or the captured image may be controlled in response to a touch input on the photo reel, the thumbnail, the tag, or the share button. The input unit 130 may receive a user's touch input on the thumbnail, the tag, or the share button. The input unit 130 may receive a tap input, a drag input, a swipe input, a slide input, a flick input, a pinch input, or a press-and-hold input as the touch input.

The control unit 150 may control the captured image in response to the received touch input. For example, the control unit 150 may display the captured image, enlarge the captured image, or reduce the captured image in response to the received touch input. In addition, the control unit 150 may display the captured image, enlarge the captured image, or reduce the captured image in response to the received touch input. In response to the received touch input, the control unit 150 may display the thumbnails included in the photo reel as one stacked group or may merge the captured images into one panoramic image. In addition, in response to the received touch input, the control unit 150 may display the gallery screen or transmit the captured images to the outside.

Hereinafter, operation S150 of controlling the captured image in response to the touch input will be described below.

The input unit 130 may receive a user's tap input on one of thumbnails included in the photo reel.

Figure 7:
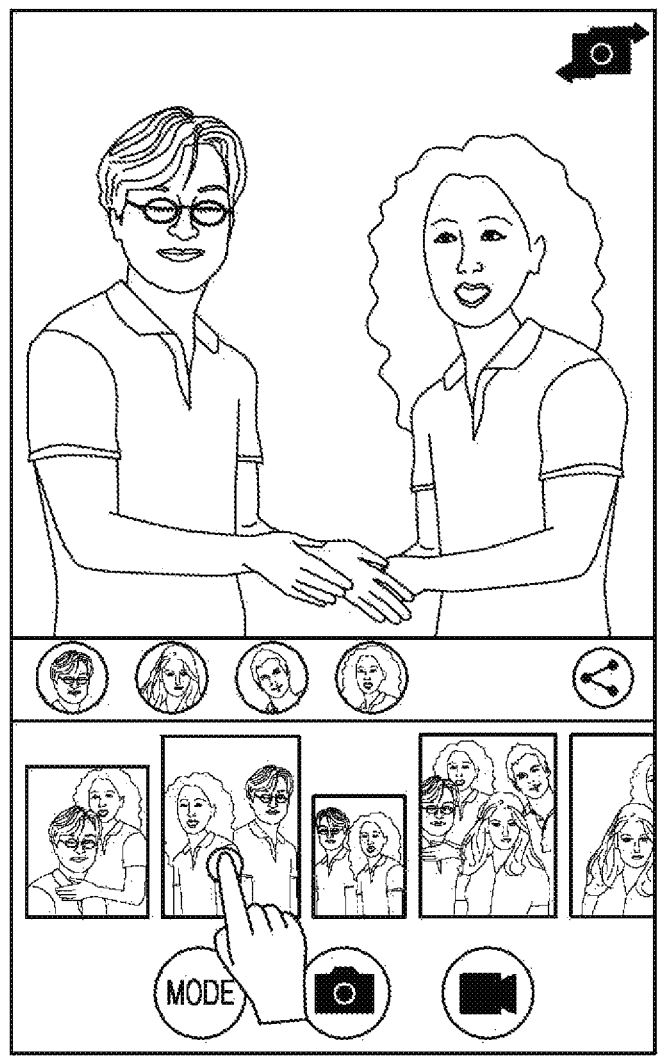
FIG. 7 is a diagram of a screen in a case where a tap input on a thumbnail is received according to an embodiment of the present disclosure.

FIG. 7 is a diagram of a screen in a case where a user's tap input on a thumbnail is received according to an embodiment of the present disclosure.

Referring to FIG. 7, the input unit 130 may receive a user's tap input on a thumbnail displayed at the second leftmost position among thumbnails included in the photo reel.

In response to the user's tap input, the display unit 120 may display an image corresponding to the thumbnail displayed at the second leftmost position in full screen.

Figure 8:
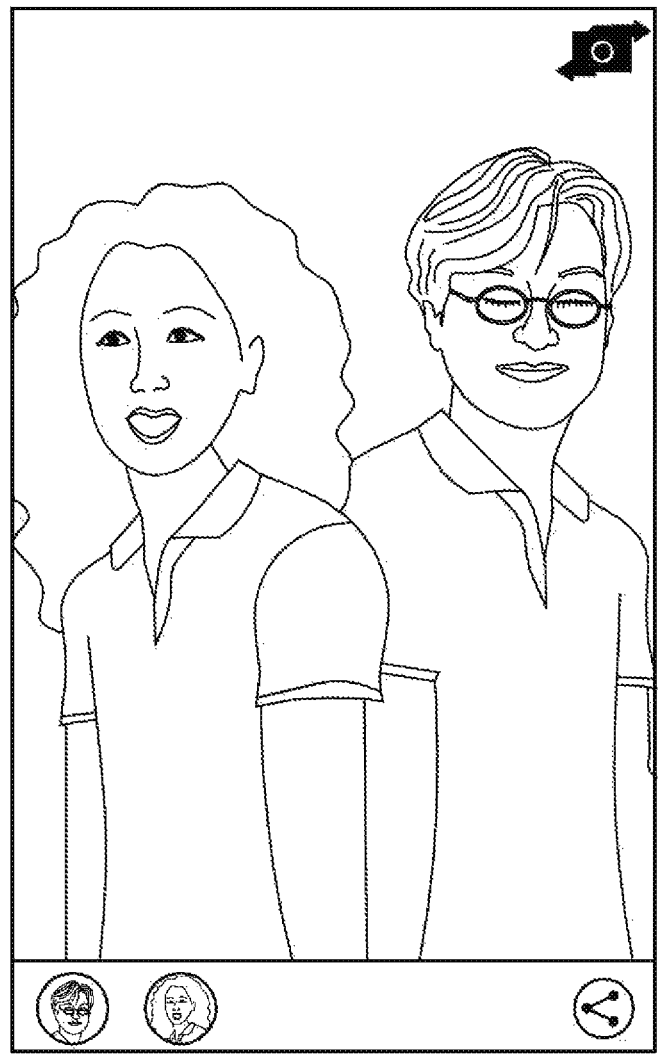
FIG. 8 is a diagram of a screen in a case where an image corresponding to a thumbnail is displayed in full screen according to an embodiment of the present disclosure.

FIG. 8 is a diagram of a screen in a case where an image corresponding to a thumbnail is displayed in full screen according to an embodiment of the present disclosure.

Referring to FIG. 8, the display unit 120 may display a tag corresponding to a subject recognized from the image, which is displayed in full screen, and a share button on the displayed image.

In addition, the input unit 130 may receive a user's press-and-hold input on one of the thumbnails included in the photo reel. The input unit 130 may receive a touch input on one of the thumbnails, and when the touch input is held beyond a preset threshold time, the control unit 150 may determine that a press-and-hold input has been received. The threshold time may be, for example, 2 seconds.

In response to the user's press-and-hold input, the storage unit 140 may store an image corresponding to the thumbnail from the press-and-hold input is received. The display unit 120 may display a message indicating that the storing has been completed.

Figure 9:
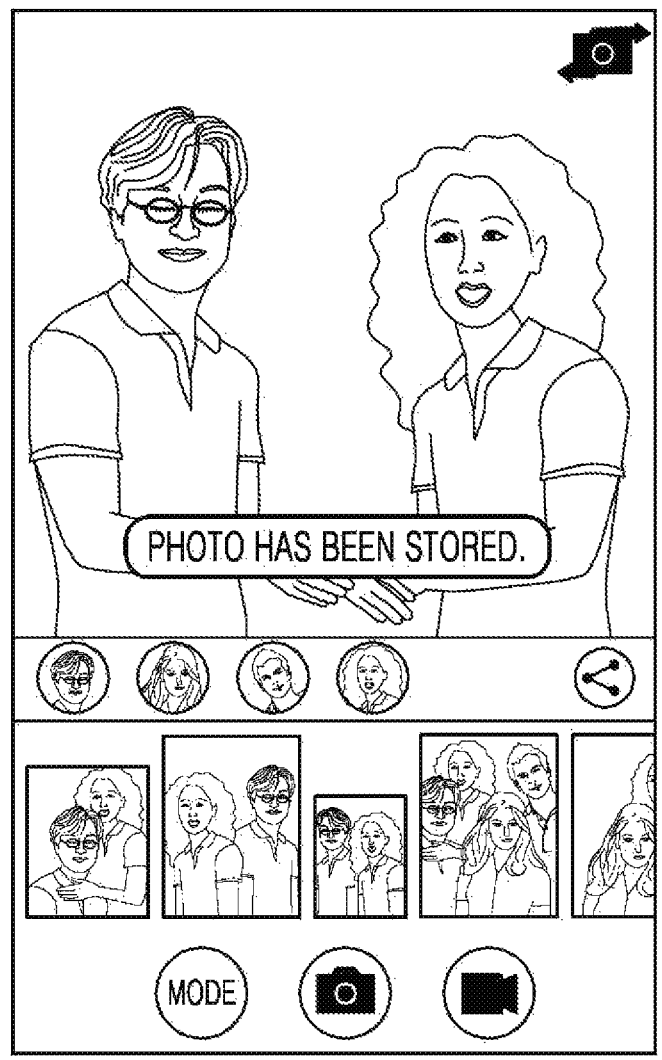
FIG. 9 is a diagram of a screen immediately after an image corresponding to a thumbnail is stored according to an embodiment of the present disclosure.

FIG. 9 is a diagram of a screen immediately after the image corresponding to the thumbnail is stored according to an embodiment of the present disclosure.

Referring to FIG. 9, the input unit 130 may receive a user's swipe-down input on one of the thumbnails included in the photo reel.

Figure 10:
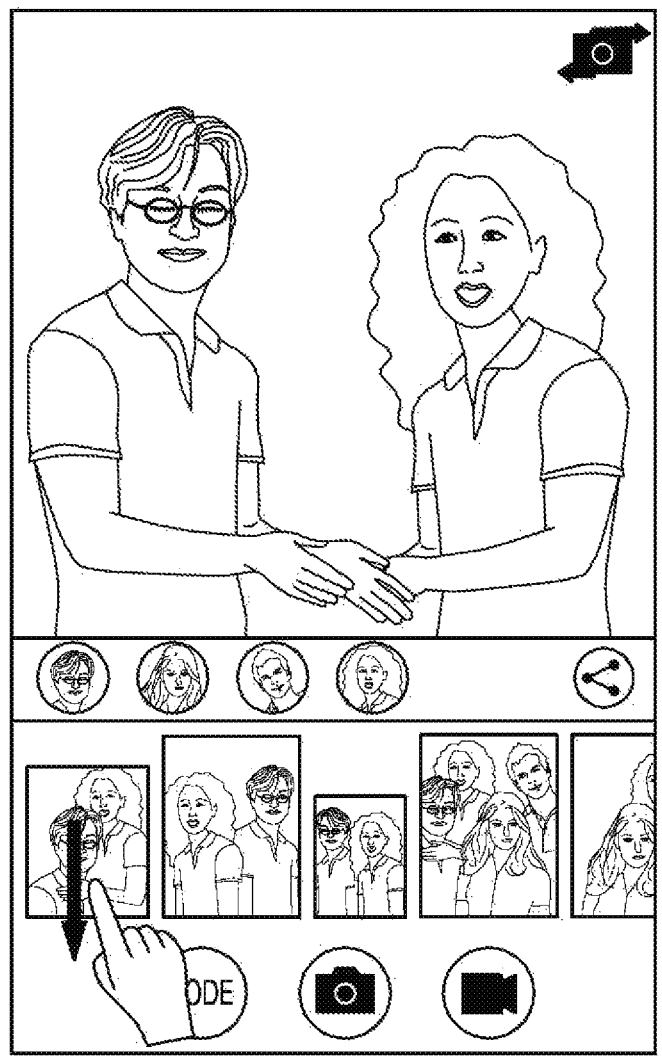
FIG. 10 is a diagram of a screen in a case where a swipe-down input on a thumbnail is received according to an embodiment of the present disclosure.

FIG. 10 is a diagram of a screen in a case where the swipe-down input on the thumbnail is received according to an embodiment of the present disclosure.

Referring to FIG. 10, the input unit 130 may receive a swipe-down input on a thumbnail displayed at the leftmost position.

In response to the swipe-down input, the storage unit 140 may delete an image corresponding to the thumbnail from the swipe-down input is received. The display unit 120 may no longer display the thumbnail, from which the swipe-down input is received, in the photo reel. The display unit 120 may display the thumbnails having been displayed on the right side of the thumbnail, from which the swipe-down input is received, by shifting to the left from the original positions thereof. In addition, the display unit 120 may display a message indicating that the deletion has been completed. The display unit 120 may further display an undo button.

Figure 11:
FIG. 11 is a diagram of a screen immediately after an image corresponding to a thumbnail is deleted according to an embodiment of the present disclosure.

FIG. 11 is a diagram of a screen immediately after the image corresponding to the thumbnail is deleted according to an embodiment of the present disclosure.

Referring to FIG. 11, when the user taps the undo button, the deleted image may be restored and the same photo reel as before the deletion of the image may be displayed.

In addition, the input unit 130 may receive a user's pinch input on the photo reel.

Figure 12:
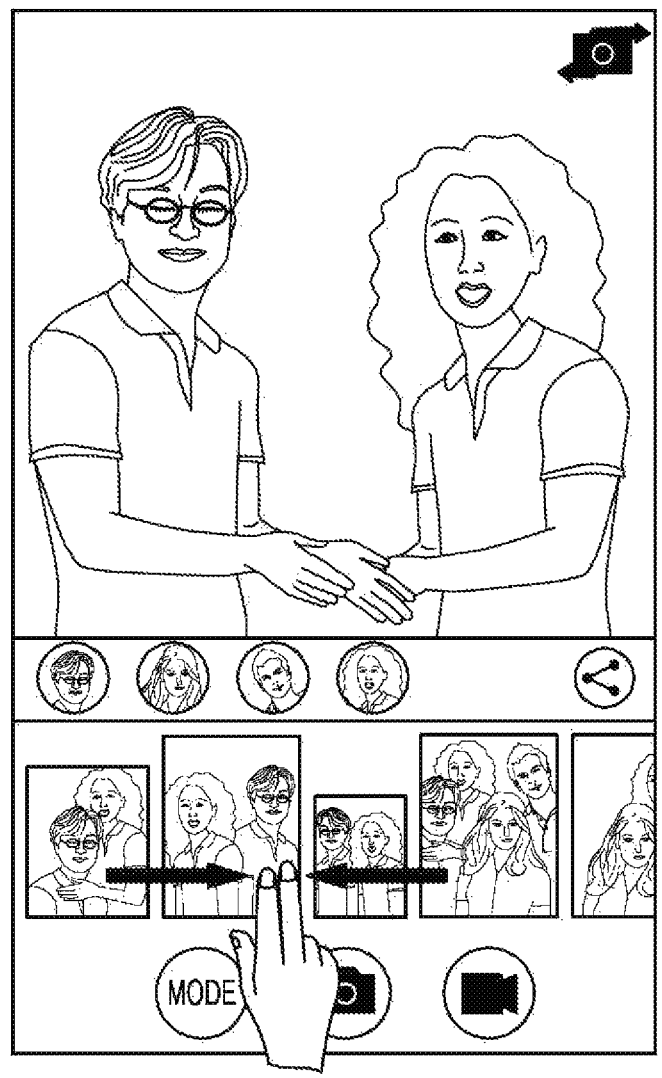
FIG. 12 is a diagram of a screen in a case where a pinch input on a photo reel is received according to an embodiment of the present disclosure.

FIG. 12 is a diagram of a screen in a case where the pinch input on the photo reel is received according to an embodiment of the present disclosure.

Referring to FIG. 12, the input unit 130 may receive a pinch input of pinching together to collect two thumbnails included in the photo reel inwardly.

In response to the pinch input, the display unit 120 may display the thumbnails included in the photo reel as one stacked group.

Figure 13:
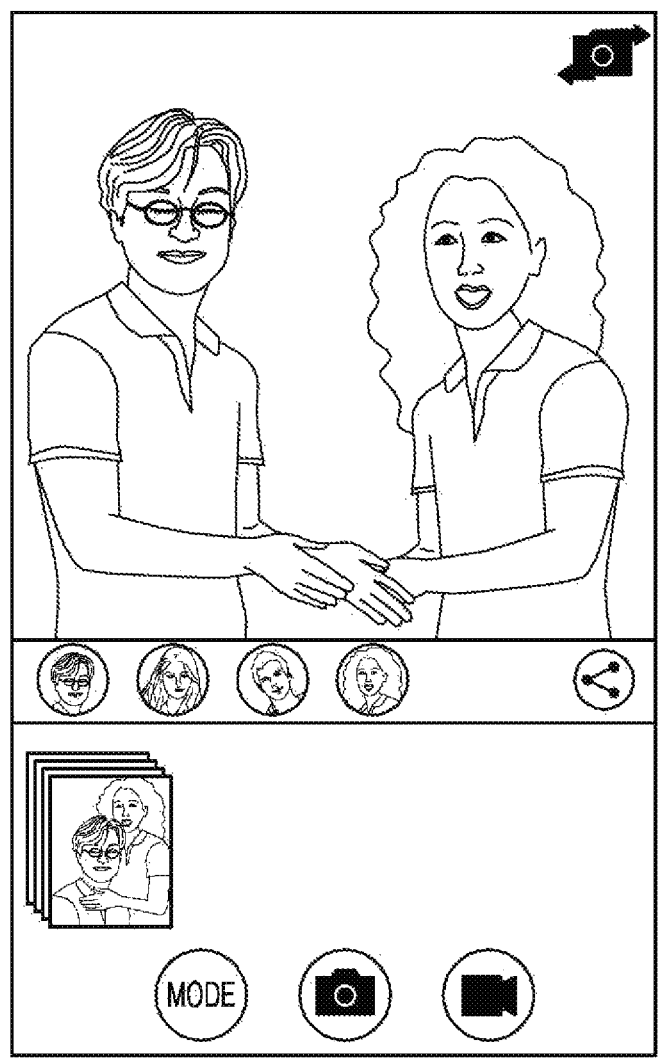
FIG. 13 is a diagram of a screen in a case where thumbnails included in a photo reel are stacked as one group according to an embodiment of the present disclosure.

FIG. 13 is a diagram of a screen in a case where the thumbnails included in the photo reel are stacked as one group according to an embodiment of the present disclosure.

Referring to FIG. 13, the thumbnails included in the photo reel may be displayed in a left lower portion as one stacked group like a card desk. In this manner, it is possible to prevent the camera preview screen from being covered with the photo reel.

According to another embodiment of the present disclosure, the control unit 150 may merge the captured images into one panoramic image in response to the pinch input. In addition, the display unit 120 may display thumbnails of the panoramic image instead of the existing thumbnails displayed in the photo reel.

Figure 14:
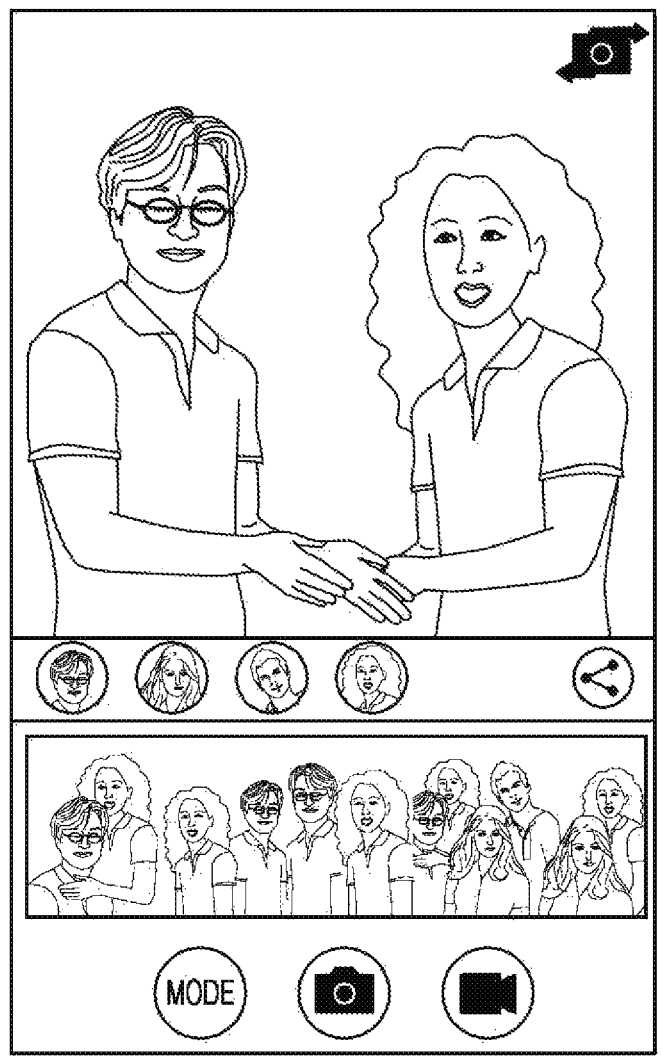
FIG. 14 is a diagram of a screen in a case where thumbnails included in a photo reel are merged into one panoramic image according to an embodiment of the present disclosure.

FIG. 14 is a diagram of a screen in a case where the thumbnails included in the photo reel are merged into one panoramic image according to an embodiment of the present disclosure.

In addition, the input unit 130 may receive a user's slide input on the photo reel.

Figure 15:
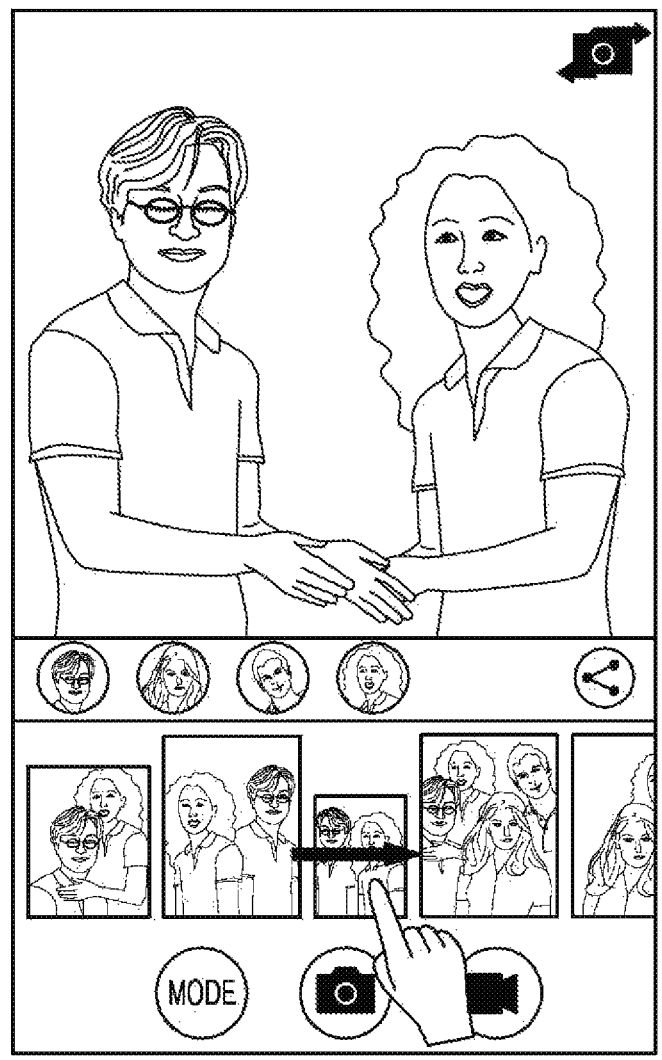
FIG. 15 is a diagram of a screen in a case where a slide input or a flick input on a photo reel is received according to an embodiment of the present disclosure.

FIG. 15 is a diagram of a screen in a case where the slide input on the photo reel is received according to an embodiment of the present disclosure.

Referring to FIG. 15, the input unit 130 may receive a slide-right input on one of the thumbnails included in the photo reel.

In response to the slide-right input, the display unit 120 may display the scrolling of the thumbnails included in the photo reel. For example, as illustrated in FIG. 15, when the slide-right input is received, the display unit 120 may display the thumbnails included in the photo reel by shifting to the right from the original positions thereof.

In addition, the input unit 130 may receive a user's flick input on the photo reel. FIG. 15 is a diagram of a screen in a case where the flick input on the photo reel is received, according to an embodiment of the present disclosure. As illustrated in FIG. 15, the input unit 130 may receive a flick-right input on one of the thumbnails included in the photo reel.

The display unit 120 may display a gallery screen in response to the flick input.

Figure 16:
FIG. 16 is a diagram of a gallery screen displayed on the image display apparatus according to an embodiment of the present disclosure.

FIG. 16 is a diagram of the gallery screen displayed on the image display apparatus 100 according to an embodiment of the present disclosure.

Operation S150 of controlling the captured image in response to the touch input may include operation of sharing the captured image in response to the touch input.

Figure 17:
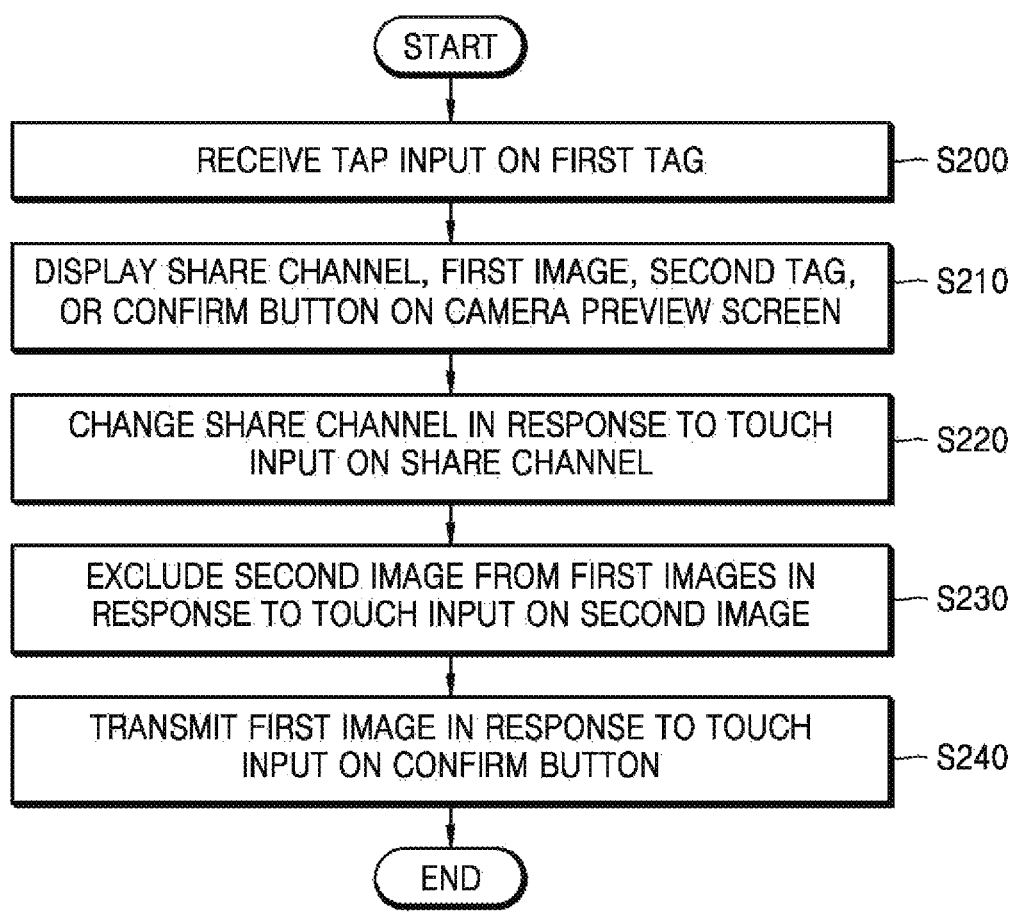
FIG. 17 is a flowchart of a process of sharing a captured image according to an embodiment of the present disclosure.

FIG. 17 is a flowchart of a process of sharing a captured image according to an embodiment of the present disclosure.

Referring to FIG. 17, in operation S200, a tap input on a first tag among tags may be received in operation of sharing the captured image in response to the touch input. The input unit 130 may receive a tap input on an arbitrary first tag among tags corresponding to a subject recognized from a captured image.

Figure 18:
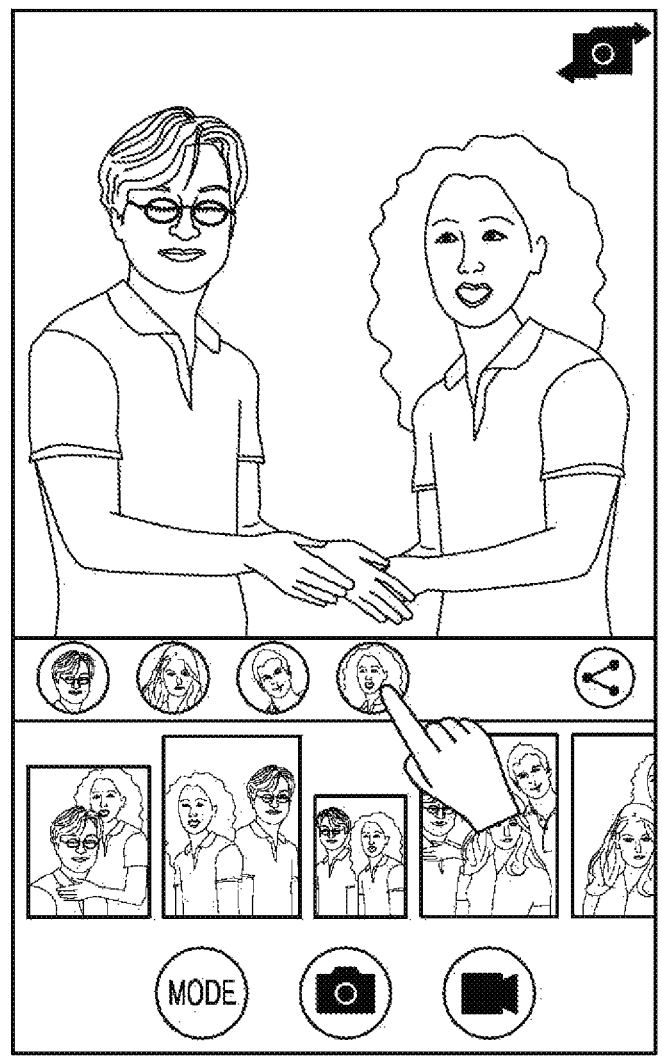
FIG. 18 is a diagram of a screen in a case where a tap input on a first tag is received according to an embodiment of the present disclosure.

FIG. 18 is a diagram of a screen in a case where the tap input on the first tag is received according to an embodiment of the present disclosure.

Referring to FIG. 18, the user may perform a tap input on the last tag among four tags arranged in a row. For example, the subject corresponding to the last tag may be "Alex".

Referring to FIG. 17 again, in operation S210, at least one of a share channel corresponding to the first tag, thumbnails of one or more first images including a first subject corresponding to the first tag among the captured images, a second tag corresponding to a subject included in the one or more first images, and a confirm button may be displayed on the camera preview screen in response to the tap input.

Figure 19:
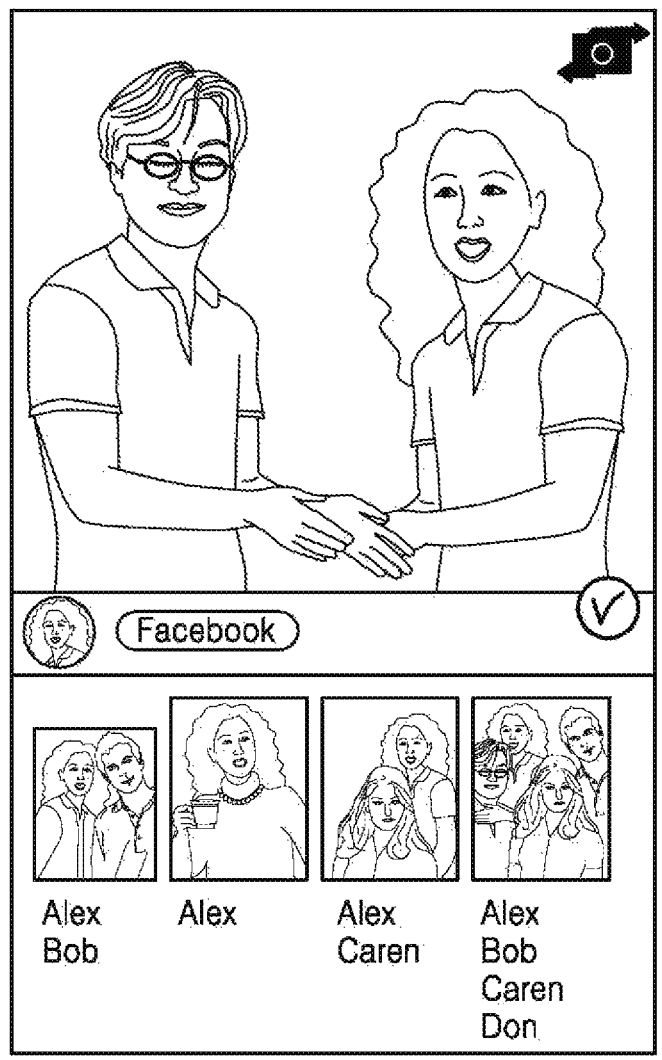
FIG. 19 is a diagram of a screen that is displayed on the image display apparatus in response to a received tap input on a first tag according to an embodiment of the present disclosure.

FIG. 19 is a diagram of a screen that is displayed on the image display apparatus 100 in response to the received tap input on the first tag according to an embodiment of the present disclosure.

Referring to FIG. 19, the display unit 120 may display the first tag from which the tap input is received. In addition, the display unit 120 may display the share channel corresponding to the first tag beside the first tag.

Subjects corresponding to the tags may have favorite share channels, respectively. For example, the favorite share channel of "Alex" may be "Facebook". The favorite share channel of "Bob" may be "Gmail". The favorite share channel of "Caren" may be "WhatsApp". The favorite share channel of "Don" may be "Instagram". The favorite share channels of the subjects may be prestored in the storage unit 140 of the image display apparatus 100. Referring to FIG. 19, the display unit 120 may display the "Facebook" beside the first tag as the favorite share channel of "Alex" corresponding to the first tag.

In addition, the display unit 120 may display thumbnails of the one or more first images including the first subject corresponding to the first tag among the captured images. Referring to the embodiment of the present disclosure illustrated in FIG. 19, the control unit 150 may detect only images including "Alex" as the first images among the entire captured images. As illustrated in FIG. 19, the number of the first images including "Alex" among the entire captured images may be four. The display unit 120 may display the thumbnails of the one or more first images under the first tag.

In addition, the display unit 120 may display a second tag corresponding to the subject included in the one or more first images. For example, one of the four first images including "Alex" may include "Alex" and "Bob". Another of the first images may include only "Alex". Another of the first images may include "Alex" and "Caren". Another of the first images may include "Alex", "Bob", "Caren", and "Don".

As illustrated in FIG. 19, the display unit 120 may display the names of "Alex" and "Bob" as the second tag under one first image. The display unit 120 may display the name of "Alex" as the second tag under another first image. The display unit 120 may display the names of "Alex" and "Caren" as the second tag under another first image. The display unit 120 may display the names of "Alex", "Bob", "Caren", and "Don" as the second tag under another first image.

In addition, the display unit 120 may display a confirm button. Referring to FIG. 19, the display unit 120 may display the confirm button in a right central portion.

Referring to FIG. 17 again, in operation S220, the share channel may be changed to another share channel in response to the touch input on the displayed share channel. For example, the user may want to share images via another share channel instead of the share channel having matched the first tag. In this case, the user may perform a touch input on the share channel displayed on the display unit 120. In response to the user's touch input, the control unit 150 may change the displayed share channel to another share channel. The display unit 120 may display the changed share channel.

In operation S230, the second image may be excluded from the first images in response to the touch input on the thumbnail of the second image among the thumbnails of the first images. For example, the user may not want to share at least some of the first images including the subject corresponding to the first tag. In this case, the user may perform a touch input on the thumbnails of the second images that the user does not want to share among the first images displayed on the display unit 120. The control unit 150 may exclude the second images corresponding to the thumbnails, from which the touch input is received, from the first images. The display unit 120 may no longer display the thumbnails from which the touch input is received, or may display the relevant thumbnails in a disabled state.

In operation S240, the first image may be transmitted to the first subject via the share channel in response to a touch input on the confirm button. Referring to the embodiment of the present disclosure illustrated in FIG. 19, the communication unit 160 may transmit the four first images to "Alex" via the "Facebook" in response to the touch input on the confirm button. According to another embodiment of the present disclosure, the communication unit 160 may transmit four first images to all subjects included in the first images in response to a touch input on the confirm button. For example, the communication unit 160 may transmit the first images to "Alex", "Bob", "Caren", and "Don".

Figure 20:
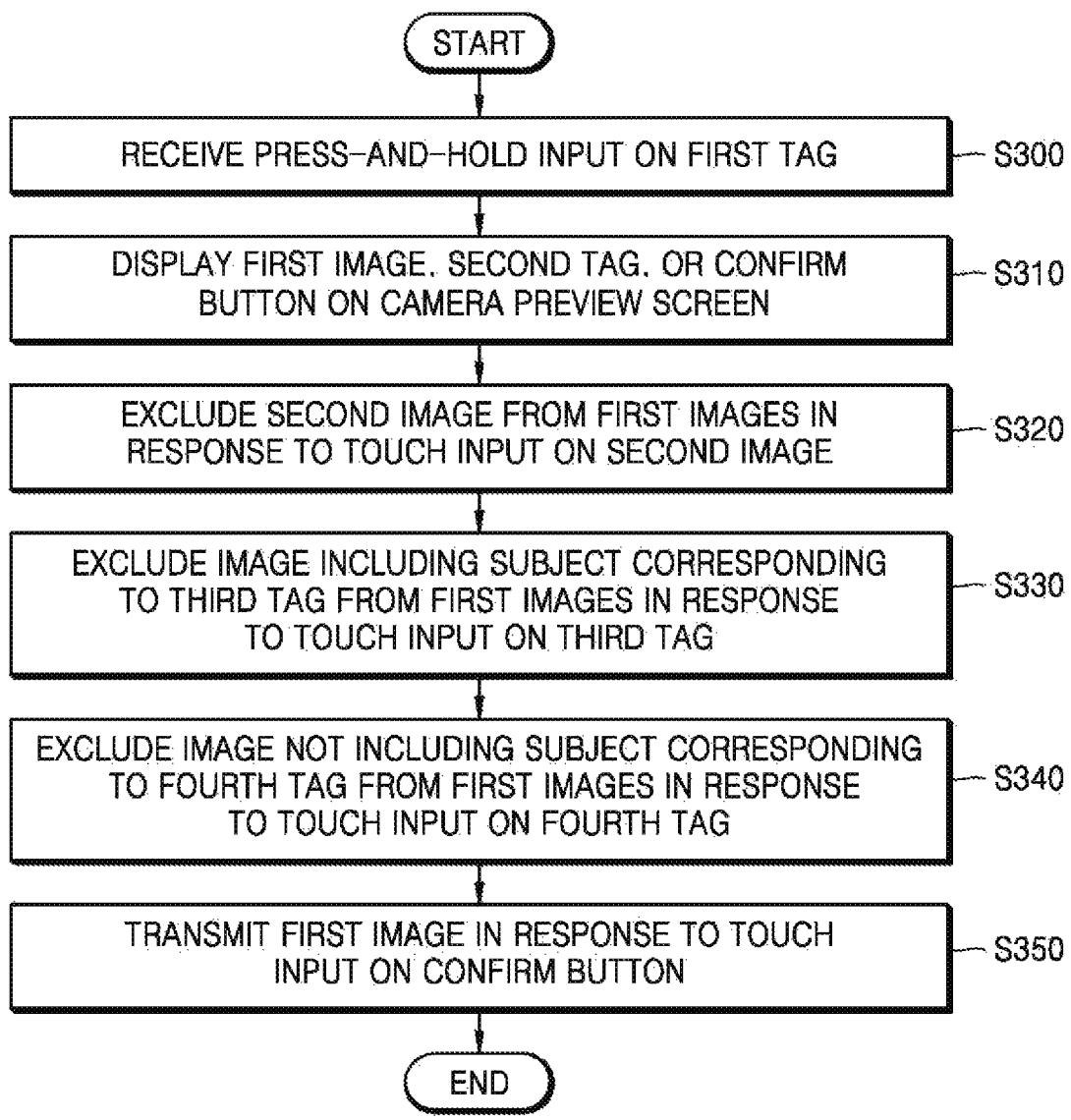
FIG. 20 is a flowchart of a process of sharing a captured image according to an embodiment of the present disclosure.

FIG. 20 is a flowchart of a process of sharing a captured image according to another embodiment of the present disclosure.

Referring to FIG. 20, in operation S300, a first touch input on the first tag among the tags may be received in operation of sharing the captured image in response to the touch input. The input unit 130 may receive a first touch input on an arbitrary first tag among tags corresponding to a subject recognized from a captured image. The first touch input may be a press-and-hold input.

Figure 21:
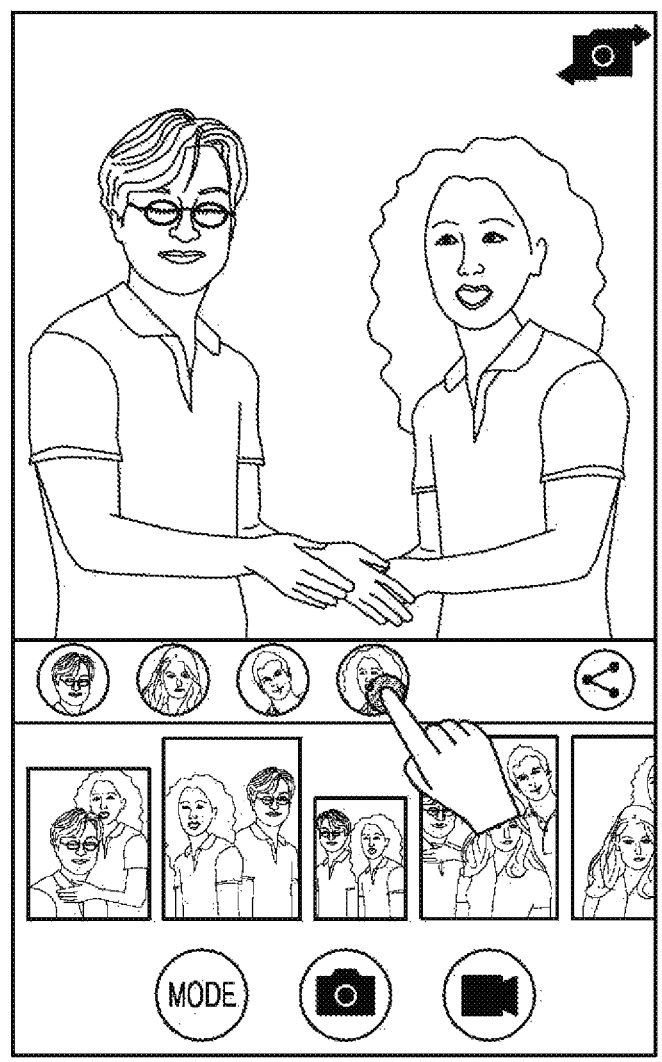
FIG. 21 is a diagram of a screen in a case where a press-and-hold input on a first tag is received according to an embodiment of the present disclosure.

FIG. 21 is a diagram of a screen in a case where a press-and-hold input on the first tag is received according to an embodiment of the present disclosure.

Referring to FIG. 21, the user may perform a press-and-hold input on the last tag among four tags arranged in a row. The subject corresponding to the last tag may be "Alex".

Referring to FIG. 20 again, in operation S310, when a hold time of the first touch input exceeds a threshold time, at least one of thumbnails of one or more first images including a first subject corresponding to the first tag among the captured images, a second tag corresponding to a subject included in the one or more first images, and a confirm button may be displayed on the camera preview screen.

Figure 22:
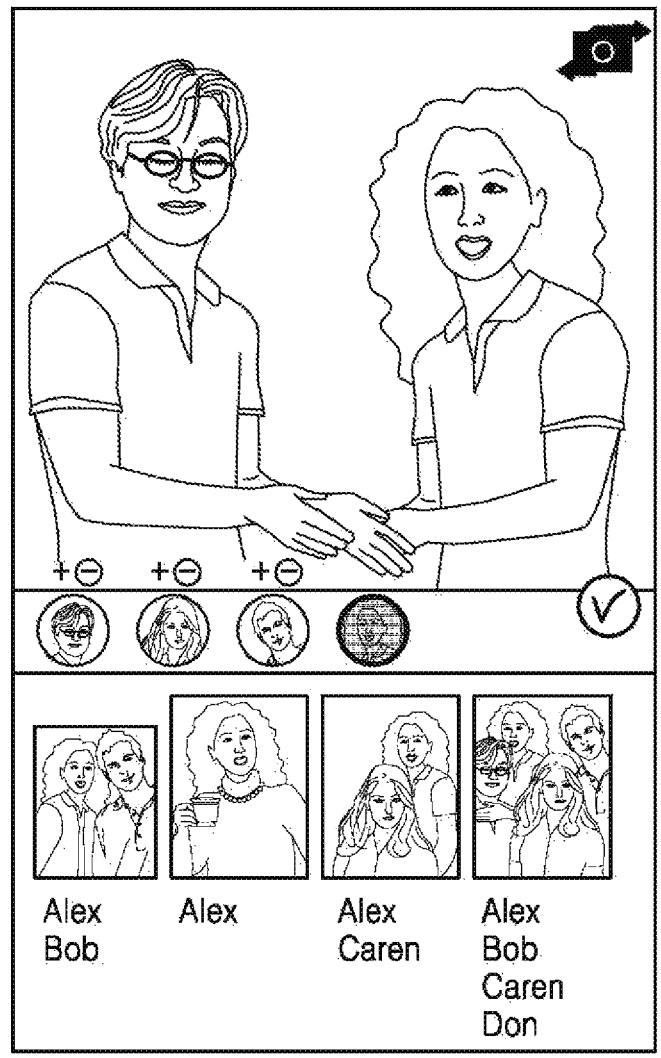
FIG. 22 is a diagram of a screen that is displayed on the image display apparatus in response to a received touch input on a first tag according to an embodiment of the present disclosure.

FIG. 22 is a diagram of a screen that is displayed on the image display apparatus 100 in response to the received touch input on the first tag according to an embodiment of the present disclosure.

Referring to FIG. 22, the display unit 120 may display the first tag, from which the first touch input is received, in a highlighted manner. In addition to the icons corresponding to the subjects, "+" button and "−" button may be further displayed to the remaining tags except for the first tag. The display unit 120 may further display the "+" button and the "−" button above the icons corresponding to the remaining tags. For example, as illustrated in FIG. 22, the display unit 120 may display the icon corresponding to "Bob", the "+" button, and the "−" button as the tag corresponding to "Bob". The "+" button and the "−" button may be displayed above the icon corresponding to "Bob". The display unit 120 may display the icon corresponding to "Caren", the "+" button, and the "−" button as the tag corresponding to "Carben". The display unit 120 may display the icon corresponding to "Don", the "+" button, and the "−" button as the tag corresponding to "Don".

All the displayed "−" buttons may be displayed in an enabled state. Thereafter, the user may perform a touch input on one of the displayed "−" buttons, and the control unit 150 may perform an operation in response to the touch input. A detailed description of the operation will be described below. All the displayed "+" buttons may be displayed in a disabled state. Thereafter, the user may perform a touch input on one of the displayed "+" button, and the control unit 150 may not perform any operation in response to the touch input.

In addition, the display unit 120 may display thumbnails of the one or more first images including the first subject corresponding to the first tag among the captured images. Referring to the embodiment of the present disclosure illustrated in FIG. 22, the control unit 150 may detect only images including "Alex" as the first images among the entire captured images. As illustrated in FIG. 22, the number of the first images including "Alex" among the entire captured images may be four. The display unit 120 may display the thumbnails of the one or more first images under the tag. In other words, the display unit 120 may display only four thumbnails that include "Alex" among the entire thumbnails included in the photo reel.

In addition, the display unit 120 may display a second tag corresponding to the subject included in the one or more first images. For example, one of the four first images including "Alex" may include "Alex" and "Bob". Another of the first images may include only "Alex". Another of the first images may include "Alex" and "Caren". Another of the first images may include "Alex", "Bob", "Caren", and "Don".

As illustrated in FIG. 22, the display unit 120 may display the names of "Alex" and "Bob" as the second tag under one first image. The display unit 120 may display the name of "Alex" as the second tag under another first image. The display unit 120 may display the names of "Alex" and "Caren" as the second tag under another first image. The display unit 120 may display the names of "Alex", "Bob", "Caren", and "Don" as the second tag under another first image.

In addition, the display unit 120 may display a confirm button. Referring to FIG. 22, the display unit 120 may display the confirm button in a right central portion.

Referring to FIG. 20 again, in operation S320, the second image may be excluded from the first images in response to the touch input on the thumbnail of the second image among the thumbnails of the first images. For example, the user may not want to share at least some of the first images including the subject corresponding to the first tag. In this case, the user may perform a touch input on the thumbnails of the second images that the user does not want to share among the first images displayed on the display unit 120. The control unit 150 may exclude the second images corresponding to the thumbnails, from which the touch input is received, from the first images. The display unit 120 may no longer display the thumbnails from which the touch input is received, or may display the relevant thumbnails in a disabled state.

In operation S330, an image including a subject corresponding to a third tag among the first images may be excluded from the first images in response to a touch input on the third tag different from the first tag among the displayed tags.

Figure 23:
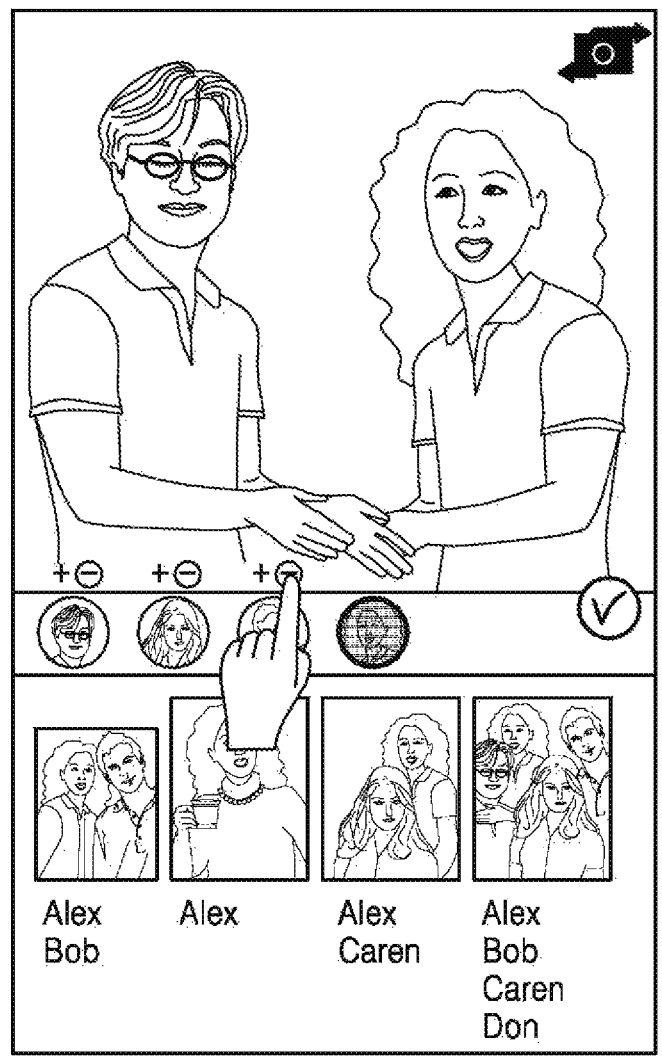
FIG. 23 is a diagram of a screen in a case where a touch input on a third tag is received according to an embodiment of the present disclosure.

FIG. 23 is a diagram of a screen in a case where a touch input on a third tag is received according to an embodiment of the present disclosure.

Referring to FIG. 23, the user may perform a touch input on the second rightmost tag among four tags arranged in a row. Specifically, the user may perform a tap input on the "−" button included in the tag displayed at the second rightmost position. A subject corresponding to the tag, from which the touch input is received, may be "Bob". In other words, the subject corresponding to the third tag may be "Bob".

Figure 24:
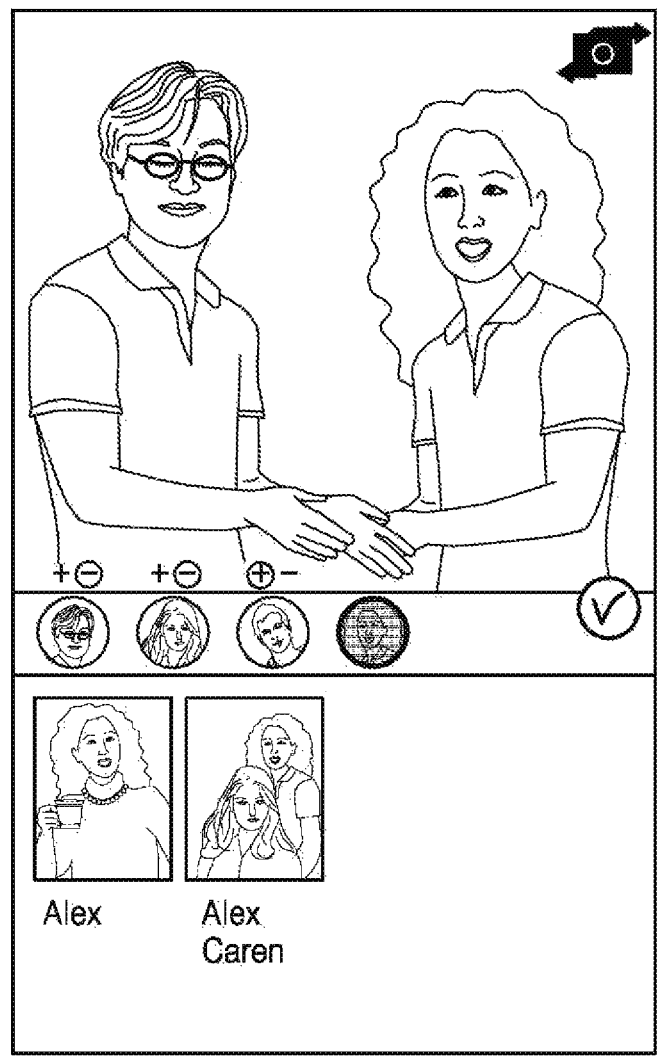
FIG. 24 is a diagram of a screen that is displayed on the image display apparatus in response to a received touch input on a third tag according to an embodiment of the present disclosure.

FIG. 24 is a diagram of a screen that is displayed on the image display apparatus 100 in response to a received touch input on a third tag according to an embodiment of the present disclosure.

In response to the touch input on the third tag, the control unit 150 may exclude images including the subject corresponding to the third tag from the first images. For example, the control unit 150 may exclude images including "Bob" from the first images corresponding to the four thumbnails illustrated in FIG. 23. The thumbnails including "Bob" among the thumbnails illustrated in FIG. 23 may be two thumbnails, that is, the leftmost thumbnail and the rightmost thumbnail. The control unit 150 may exclude the images corresponding to the two thumbnails from the first images.

The display unit 120 may no longer display the two thumbnails including "Bob", or may display the two thumbnails in a disabled state. As illustrated in FIG. 24, the display unit 120 may no longer display the two thumbnails including "Bob".

In addition, the display unit 120 may display the "−" button included in the third tag in a disabled state in response to the touch input. Thereafter, the user may perform a touch input on the disabled "−" button, and the control unit 150 may not perform any operation in response to the touch input.

At the same time, the display unit 120 may display the "+" button included in the third tag in an enabled state. Thereafter, the user may perform a touch input on the enabled "+" button, and the control unit 150 may add the excluded image again to the first image in response to the touch input. In other words, the control unit 150 may add the images corresponding to two thumbnails, each of which includes "Bob" among the thumbnails illustrated in FIG. 23, again to the first image. The display unit 120 may display four thumbnails again as illustrated in FIG. 23. In addition, the display unit 120 may display the "+" button included in the third tag in a disabled state and display the "−" button included in the third tag in an enabled state.

Referring to FIG. 20 again, in operation S340, an image not including a subject corresponding to a fourth tag among the first images may be excluded from the first images in response to a touch input on the fourth tag different from the first tag and the third tag among the displayed tags.

Figure 25:
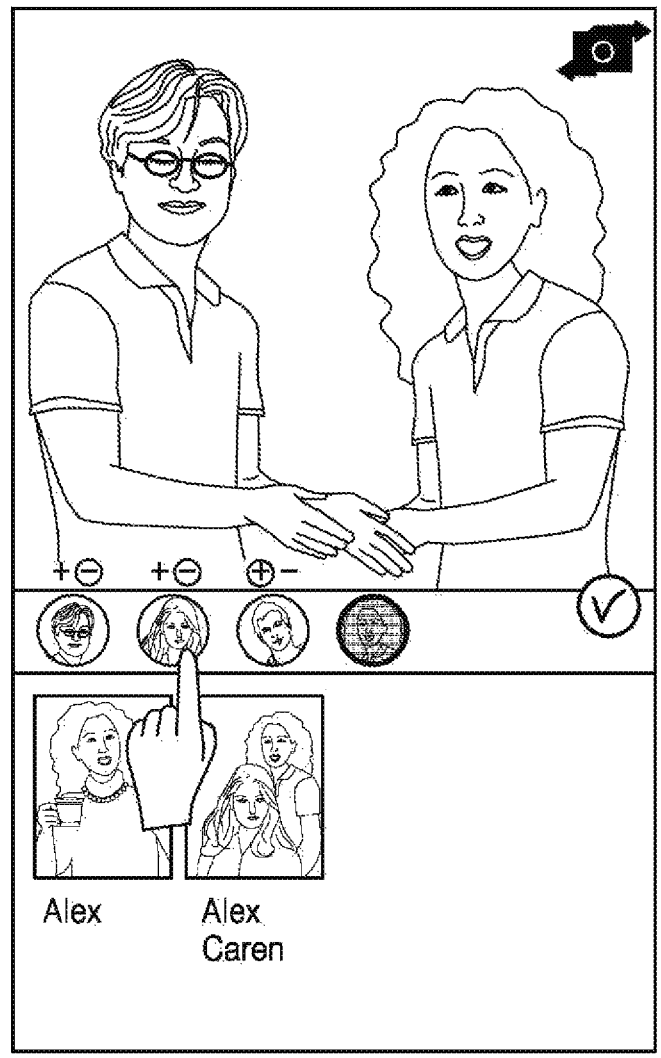
FIG. 25 is a diagram of a screen in a case where a touch input on a fourth tag is received according to an embodiment of the present disclosure.

FIG. 25 is a diagram of a screen in a case where a touch input on a fourth tag is received according to an embodiment of the present disclosure.

Referring to FIG. 25, the user may perform a touch input on the second leftmost tag among the four tags illustrated in FIG. 25. Specifically, the user may perform a tap input on an icon included in a tag displayed at the second leftmost position. A subject corresponding to the tag, from which the touch input is received, may be "Caren". In other words, the subject corresponding to the fourth tag may be "Caren".

In response to the touch input on the fourth tag, the control unit 150 may exclude an image not including the subject corresponding to the fourth tag from the first images. For example, the control unit 150 may exclude an image not including "Caren" from the first images corresponding to two thumbnails illustrated in FIG. 25. The thumbnail not including "Caren" among the thumbnails illustrated in FIG. 25 may be one thumbnail, that is, the leftmost thumbnail. The control unit 150 may exclude the image corresponding to the leftmost thumbnail from the first images.

The display unit 120 may no longer display the thumbnail not including "Caren", or may display the thumbnail in a disabled state.

Figure 26:
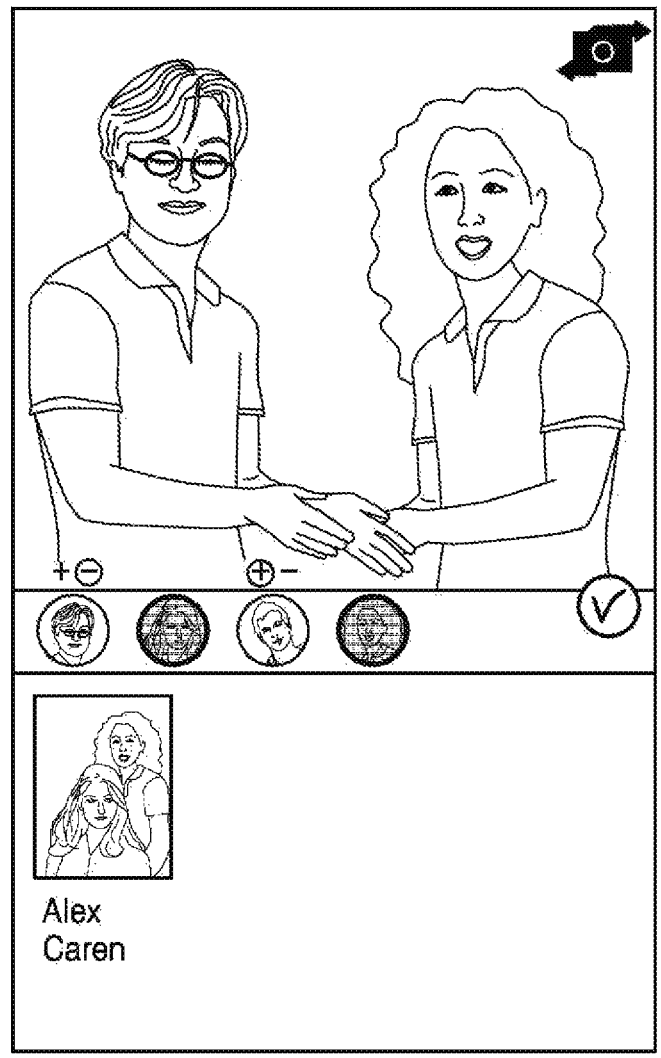
FIG. 26 is a diagram of a screen that is displayed on the image display apparatus in response to a received touch input on a fourth tag according to an embodiment of the present disclosure.

FIG. 26 is a diagram of a screen that is displayed on the image display apparatus 100 in response to the received touch input on the fourth tag according to an embodiment of the present disclosure.

Referring to FIG. 26, the display unit 120 may no longer display the thumbnail not including "Caren".

The display unit 120 may display a fourth tag, from which the touch input is received, in a highlighted manner. In addition, the display unit 120 may not display a "+" button and a "−" button included in the fourth tag. For example, as illustrated in FIG. 26, the display unit 120 may display only an icon corresponding to "Caren" as a tag corresponding to "Caren" and may not display a "+" button and a "−" button.

If the user performs a touch input again on the tag corresponding to "Caren", the control unit 150 may add the excluded image to the first image in response to the touch input. In other words, the control unit 150 may add an image corresponding to one thumbnail, which does not include "Caren" among the thumbnails illustrated in FIG. 25, again to the first image. The display unit 120 may display two thumbnails again as illustrated in FIG. 25. In addition, the display unit 120 may display the icon corresponding to "Caren", the "+" button, and the "−" button again as the tag corresponding to "Caren".

If the touch input on the tag corresponding to "Caren" is received as the fourth tag in a state of FIG. 22, the control unit 150 may exclude images not including "Caren" from the first images corresponding to the four thumbnails illustrated in FIG. 22. The thumbnails not including "Caren" among the thumbnails illustrated in FIG. 22 may be two thumbnails, that is, the leftmost thumbnail and the second rightmost thumbnail. The control unit 150 may exclude the images corresponding to the two thumbnails from the first images. The display unit 120 may no longer display the two thumbnail not including "Caren", or may display the two thumbnail in a disabled state.

Referring to FIG. 20 again, in operation S350, the first image may be transmitted in response to a touch input on the confirm button. Referring to the embodiment of the present disclosure illustrated in FIG. 26, the communication unit 160 may transmit one first image to "Alex" and "Caren" in response to the touch input on the confirm button.

Figure 27:
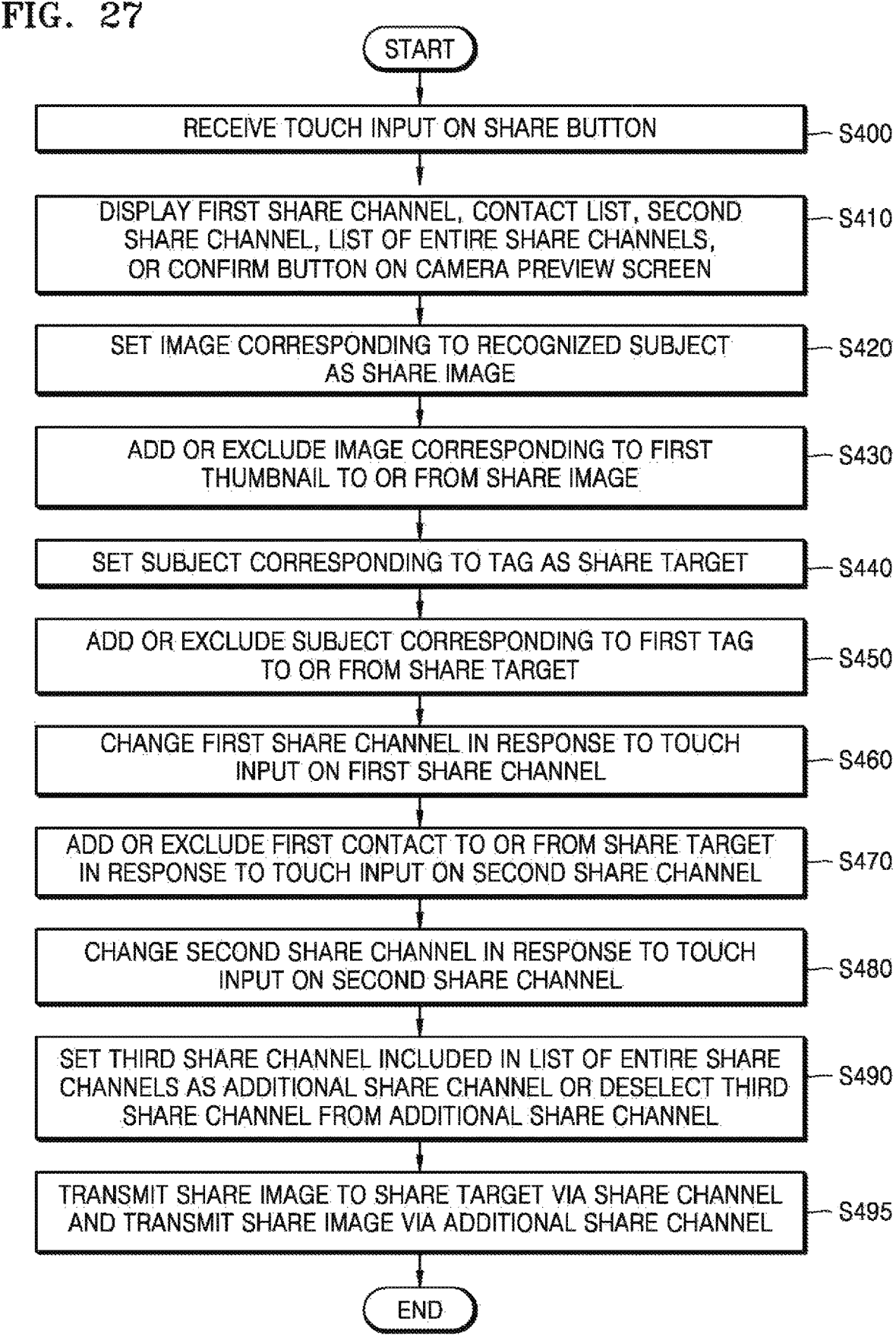
FIG. 27 is a flowchart of a process of sharing a captured image according to an embodiment of the present disclosure.

FIG. 27 is a flowchart of a process of sharing a captured image according to another embodiment of the present disclosure.

Referring to FIG. 27, in operation S400, a touch input on the share button may be received in operation of sharing the captured image in response to the response to the touch input. Referring to FIG. 3, the input unit 130 may receive a user's touch input on the share button.

Referring to FIG. 27 again, in operation S410, at least one of a first share channel corresponding to the tag, a contact list, a second share channel corresponding to each contact included in the contact list, a list of entire share channels, and a confirm button may be displayed on the camera preview screen.

Figure 28:
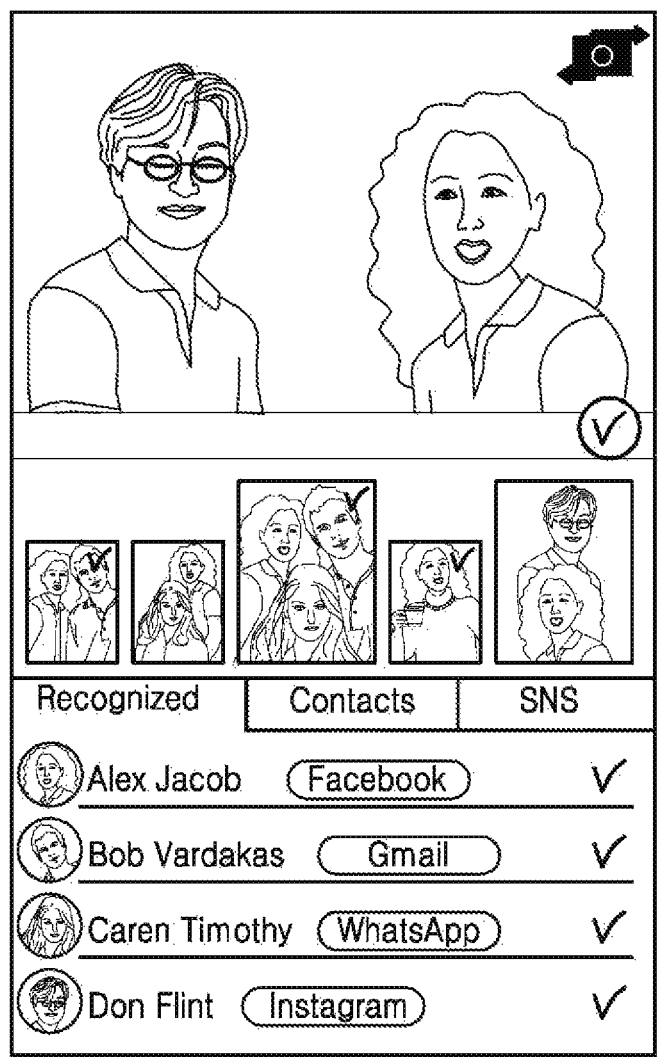
FIG. 28 is a diagram of a screen that is displayed on the image display apparatus in response to a received touch input on a share button according to an embodiment of the present disclosure.

FIG. 28 is a diagram of a screen that is displayed on the image display apparatus 100 in response to the received touch input on the share button according to an embodiment of the present disclosure.

Referring to FIG. 28, the display unit 120 may display four tags. The display unit 120 may display an icon corresponding to a subject and a full name of the subject as the tag corresponding to the recognized subject.

In addition, the display unit 120 may display first share channels respectively corresponding to the tags beside the tags. Referring to FIG. 28, the display unit 120 may display the "Facebook", which is the favorite share channel of "Alex", beside the tag corresponding to "Alex" as the first share channel. The display unit 120 may display the "Gmail", which is the favorite share channel of "Bob", beside the tag corresponding to "Bob" as the first share channel. The display unit 120 may display the "WhatsApp", which is the favorite share channel of "Caren", beside the tag corresponding to "Caren" as the first share channel. The display unit 120 may display the "Instagram", which is the favorite share channel of "Don", beside the tag corresponding to "Don" as the first share channel.

Figure 29:
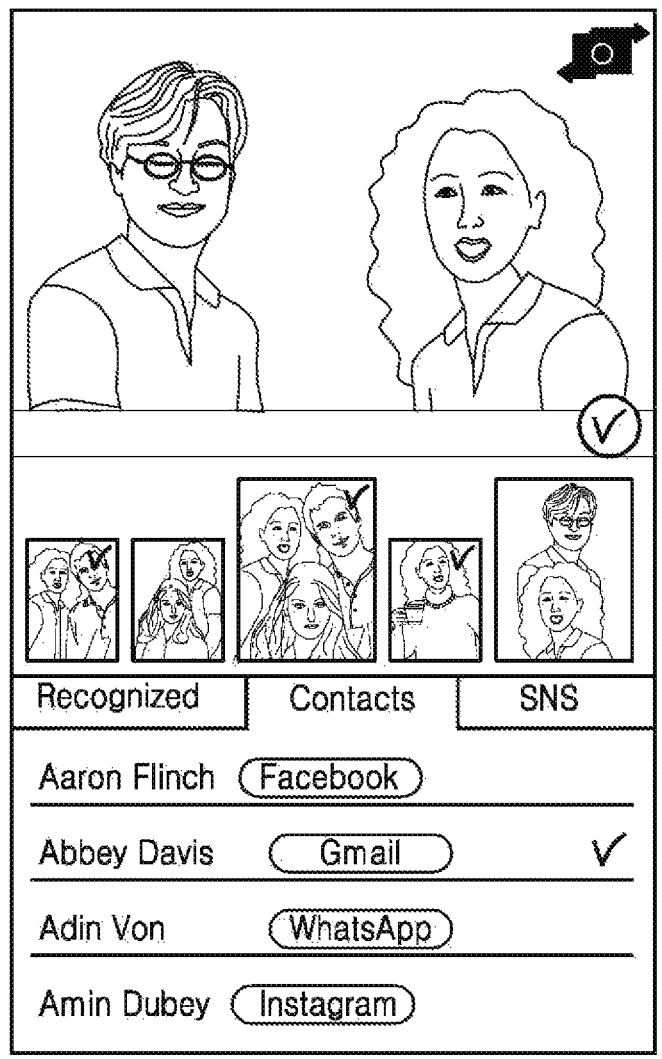
FIG. 29 is a diagram of a screen that is displayed on the image display apparatus in response to a received touch input on a share button according to an embodiment of the present disclosure.

FIG. 29 is a diagram of a screen that is displayed on the image display apparatus 100 in response to the received touch input on the share button according to another embodiment of the present disclosure.

Referring to FIG. 29, the display unit 120 may display a contact list and second share channels respectively corresponding to contacts included in the contact list. The display unit 120 may display full names of the contacts as the contact list. For example, as illustrated in FIG. 29, the display unit 120 may display "Alex Jacob", "Bob Vardakas", "Caren Timothy", and "Don Flint". In addition, the display unit 120 may display "Facebook", which is the favorite share channel of "Alex Jacob", beside the full name of "Alex Jacob" as the second share channel. The display unit 120 may display "Gmail", which is the favorite share channel of "Bob Vardakas", beside the full name of "Bob Vardakas" as the second share channel. The display unit 120 may display "WhatsApp", which is the favorite share channel of "Caren Thimothy", beside the full name of "Caren Thimothy" as the second share channel. The display unit 120 may display "Instagram", which is the favorite share channel of "Don Flint", beside the full name of "Don Flint" as the second share channel.

Figure 30:
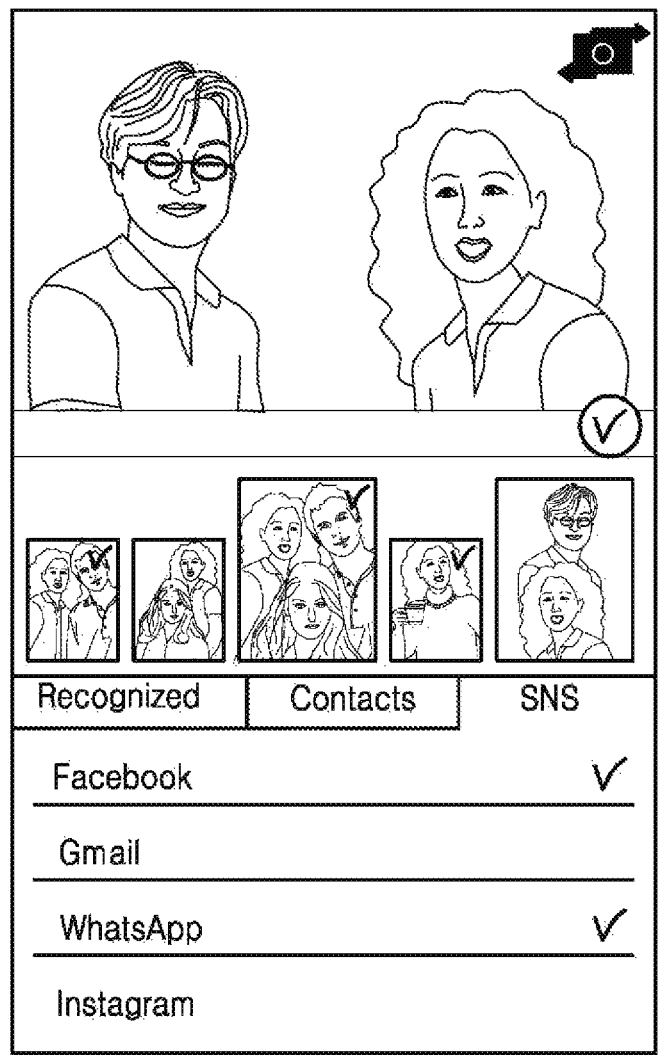
FIG. 30 is a diagram of a screen that is displayed on the image display apparatus in response to a received touch input on a share button according to an embodiment of the present disclosure.

FIG. 30 is a diagram of a screen that is displayed on the image display apparatus 100 in response to a received touch input on a share button according to another embodiment of the present disclosure.

Referring to FIG. 30, the display unit 120 may display a list of entire share channels. The display unit 120 may display names of the share channels as the list of share channels. For example, as illustrated in FIG. 30, the display unit 120 may display "Facebook", "Gmail", "WhatsApp", and "Instagram".

Referring to FIG. 27 again, in operation S420, images corresponding to the recognized subject among the captured images may be set as share images. Referring to FIG. 28, the control unit 150 may set, as the share images, images including at least one of "Alex", "Bob", "Caren", and "Don" among the captured images. Referring to FIG. 28, the display unit 120 may display check marks in the thumbnails corresponding to the images set as the share images among the thumbnails included in the photo reel.

Referring to FIG. 27 again, in operation S430, an image corresponding to a first thumbnail may be added to or excluded from the share images in response to a touch input on the first thumbnail among the thumbnails.

For example, the user may not want to share at least some of the images set as the share images. In this case, the user may perform a touch input on the first thumbnails corresponding to the images that the user does not want to share among the thumbnails to which check marks are attached. The control unit 150 may exclude the images corresponding to the first thumbnails from the share images in response to the touch input. The display unit 120 may no longer display the check marks attached to the first thumbnails.

As another example, the user may want to additionally share at least some of the images that are not set as the share images. In this case, the user may perform a touch input on the first thumbnails corresponding to the images that the user wants to share among the thumbnails to which check marks are not attached. The control unit 150 may add the images corresponding to the first thumbnails to the share images in response to the touch input. The display unit 120 may display check marks in the first thumbnails.

In operation S440, the subjects corresponding to the tags may be set as the share targets. Referring to FIG. 28, the control unit 150 may set "Alex", "Bob", "Caren", and "Don", which are the subjects corresponding to the tags, as the share targets. Referring to FIG. 28, the display unit 120 may display check marks beside the tags corresponding to the subjects included in the share targets.

Referring to FIG. 27 again, in operation S450, a subject corresponding to a first tag may be added to or excluded from the share targets in response to a touch input on the first tag among the tags.

For example, the user may not want to share images with at least some of the subjects set as the share targets. In this case, the user may perform a touch input on the first tags corresponding to the subjects with which the user does not want to share images among the tags to which check marks are attached. The control unit 150 may exclude the subjects corresponding to the first tags from the share targets in response to the touch input. The display unit 120 may no longer display the check marks attached to the first tags.

As another example, the user may want to additionally share images with at least some of the subjects that are not set as the share targets. In this case, the user may perform a touch input on the first tags corresponding to the subjects with which the user wants to share images among the tags to which check marks are not attached The control unit 150 may add the subjects corresponding to the first tags to the share targets in response to the touch input. The display unit 120 may display check marks in the first tags.

Referring to FIG. 27 again, in operation S460, the first share channel may be changed to another share channel in response to the touch input on the first share channel. For example, the user may want to share images via another share channel instead of a share channel having matched a certain tag. In this case, the user may perform a touch input on the first share channel displayed on the display unit 120. In response to the user's touch input, the control unit 150 may change the displayed first share channel to another share channel. The display unit 120 may display the changed share channel as an updated first share channel.

In operation S470, the first contact may be added to or excluded from the share targets in response to a touch input on the first contact included in the contact list.

As another example, the user may want to additionally share images with at least some of the contacts that are included in the contact list and are not set as the share targets. In this case, the user may perform a touch input on the first contact with which the user wants to share images among the contacts to which check marks are not attached. The control unit 150 may add the first contact to the share targets in response to the touch input. The display unit 120 may display a check mark in the first contact.

Referring to the embodiment of the present disclosure illustrated in FIG. 29, the user may want to additionally share images with "Bob Vardakas". In this case, the user may perform a touch input on the full name of "Bob Vardakas" displayed on the display unit 120. The control unit 150 may add "Bob Vardakas" to the share targets in response to the touch input. The display unit 120 may display a check mark beside the full name of "Bob Vardakas".

As another example, the user may not want to share images with at least some of the contacts that are included in the contact list and are set as the share targets. In this case, the user may perform a touch input on the first contact with which the user does not want to share images among the contacts to which check marks are not attached. The control unit 150 may exclude the first contact from the share targets in response to the touch input. The display unit 120 may no longer display the check mark attached to the first contact.

Referring to FIG. 27 again, in operation S480, the second share channel may be changed to another share channel in response to the touch input on the second share channel. For example, the user may want to share images via another share channel instead of a share channel having matched a certain contact. In this case, the user may perform a touch input on the second share channel displayed on the display unit 120. In response to the user's touch input, the control unit 150 may change the displayed second share channel to another share channel. The display unit 120 may display the changed share channel as an updated second share channel.

In operation S490, a third share channel may be set as or deselected from an additional share channel in response to a touch input on the third share channel included in the list of entire share channels.

For example, the user may want to additionally share images via a specific share channel, in addition to the subject corresponding to the tag and the contact included in the contact list. In this case, the user may perform a touch input on the third share channel which the user wants to use as the additional share channel in the list of the entire share channels and to which a check mark is not attached. The control unit 150 may set the third share channel as the additional share channel in response to the touch input. The display unit 120 may display a check mark in the third share channel.

Referring to the embodiment of the present disclosure illustrated in FIG. 30, the user may want to publish images via his or her own "Facebook" account and "WhatsApp" account. In this case, the user may perform a touch input on "Facebook" and "WhatsApp" displayed on the display unit 120. The control unit 150 may set "Facebook" and "WhatsApp" as the additional share channel in response to the touch input. The display unit 120 may display check marks beside "Facebook" and "WhatsApp".

As another example, the user may not want additional sharing via a specific share channel any more. In this case, the user may perform a touch input on the third share channel which the user does not want to use as the additional share channel in the list of the entire share channels and to which a check mark is attached. The control unit 150 may deselect the third share channel from the additional share channel in response to the touch input. In this case, the display unit 120 may no longer display the check mark attached to the third share channel.

Referring to FIG. 27 again, in operation S495, the share image may be transmitted to the share target via the share channel corresponding to the share target and the share image may be transmitted via the additional share channel, in response to the touch input on the confirm button. The communication unit 160 may transmit the share image to the share target via the share channel corresponding to the share target in response to the touch input on the confirm button. In addition, the communication unit 160 may transmit the share image via the additional share channel.

Figure 31:
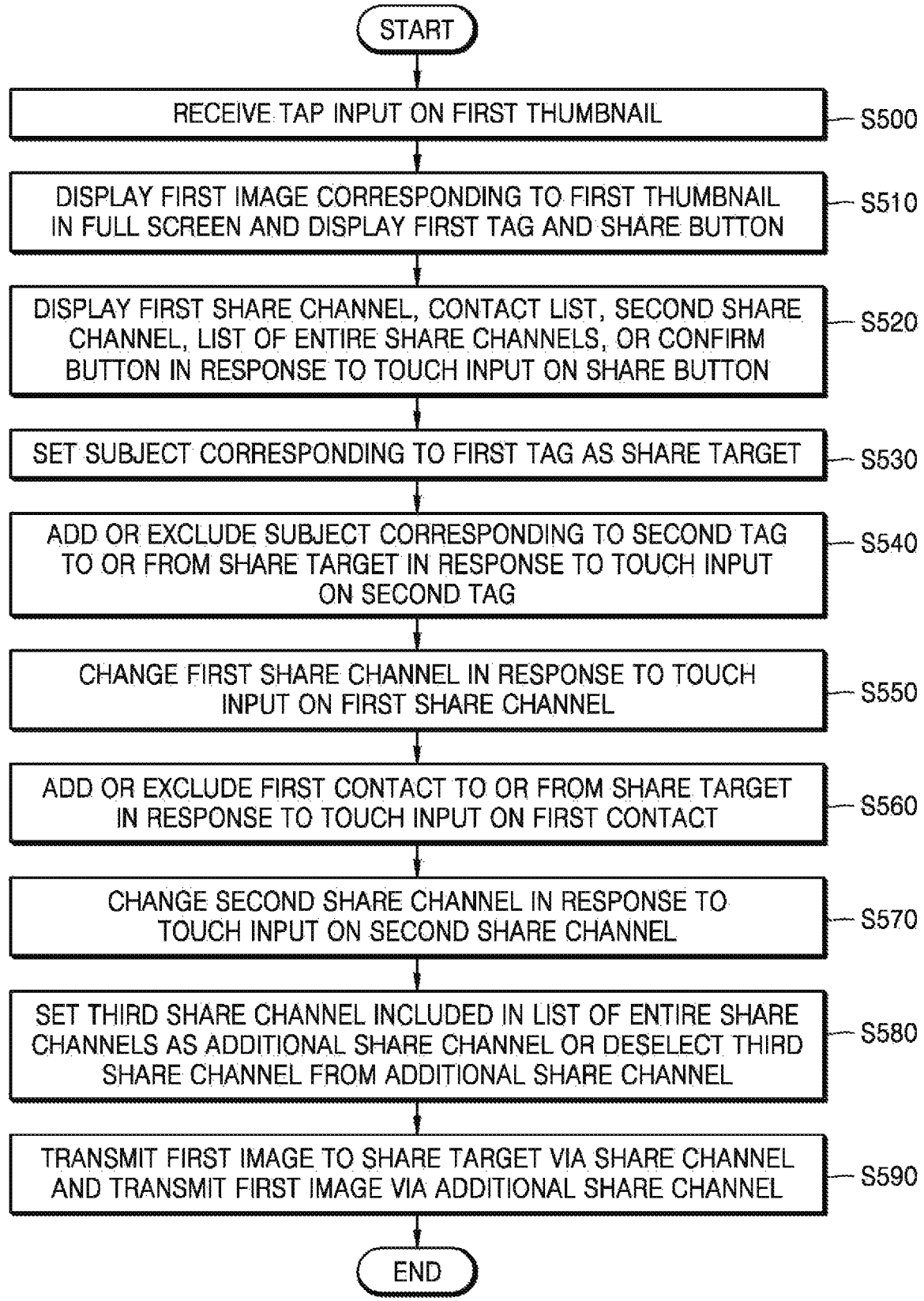
FIG. 31 is a flowchart of a process of sharing a captured image according to an embodiment of the present disclosure.

FIG. 31 is a flowchart of a process of sharing a captured image according to another embodiment of the present disclosure.

Referring to FIG. 31, in operation S500, a tap input on a first thumbnail among the thumbnails may be received in operation of sharing the captured image in response to the touch input. The input unit 130 may receive a user's tap input on one of the thumbnails included in the photo reel. As illustrated in FIG. 7, the input unit 130 may receive a user's tap input on the thumbnail displayed at the second leftmost position among the thumbnails included in the photo reel.

Referring to FIG. 31 again, in operation S510, in response to the tap input, a first image corresponding to the first thumbnail may be displayed in full screen, and a first tag corresponding to a subject included in the first image and the share button may be displayed on the first image.

In response to the tap input, the display unit 120 may display the image corresponding to the thumbnail displayed at the second leftmost position in full screen. As illustrated in FIG. 8, the display unit 120 may display a tag corresponding to a subject recognized from the image, which is displayed in full screen, and a share button on the displayed image.

Referring to FIG. 31 again, in operation S520, at least one of a first share channel corresponding to the first tag, a contact list, second share channels corresponding to contacts included in the contact list, a list of entire share channels, and a confirm button may be displayed on the first image in response to a touch input on the share button.

Figure 32:
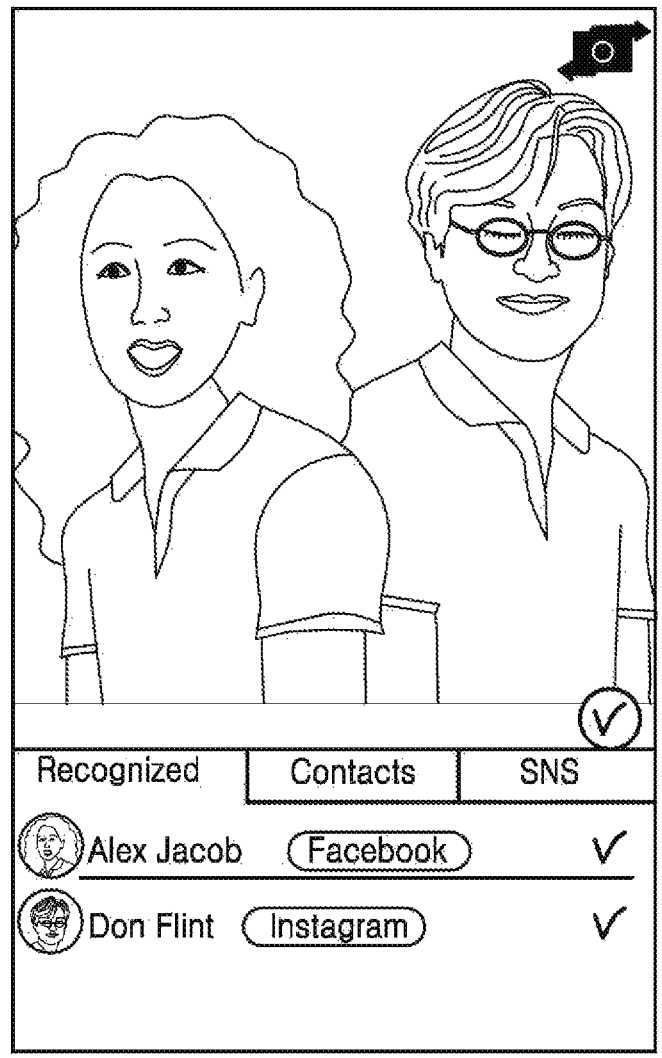
FIG. 32 is a diagram of a screen that is displayed on the image display apparatus in response to a received touch input on a share button according to an embodiment of the present disclosure.

FIG. 32 is a diagram of a screen that is displayed on the image display apparatus 100 in response to a received touch input on a share button according to an embodiment of the present disclosure.

Referring to FIG. 32, the display unit 120 may display two tags as first tags. The display unit 120 may display, as the first tags, icons corresponding to subjects included in the first image and full names of the subjects.

In addition, the display unit 120 may display the first share channels corresponding to the first tags beside the first tags. Referring to FIG. 32, the display unit 120 may display "Facebook", which is the favorite share channel of "Alex", beside the tag corresponding to "Alex" as the first share channel. The display unit 120 may display "Instagram", which is the favorite share channel of "Don", beside the tag corresponding to "Don" as the first share channel.

In addition, similar to the screen illustrated in FIG. 29, the display unit 120 may display a contact list and second share channels respectively corresponding to contacts included in the contact list. The display unit 120 may display full names of the contacts as the contact list.

In addition, similar to the screen illustrated in FIG. 30, the display unit 120 may display a list of entire share channels. The display unit 120 may display the names of the share channels as the list of entire share channels.

Referring to FIG. 32 again, in operation S530, subjects corresponding to the first tags may be set as the share targets. Referring to FIG. 32, the control unit 150 may set "Alex" and "Don", which are the subjects corresponding to the first tags, as the share targets. Referring to FIG. 32, the display unit 120 may display check marks beside the tags corresponding to the subjects included in the share targets.

In operation S540, a subject corresponding to a second tag may be added to or excluded from the share targets in response to a touch input on a second tag among the first tags.

For example, the user may not want to share images with at least some of the subjects set as the share targets. In this case, the user may perform a touch input on the second tags corresponding to the subjects with which the user does not want to share image among the tags to which check marks are attached. The control unit 150 may exclude the subjects corresponding to the second tags from the share targets in response to the touch input. The display unit 120 may no longer display the check marks attached to the second tags.

As another example, the user may want to additionally share images with at least some of the subjects that are not set as the share targets. In this case, the user may perform a touch input on the second tags corresponding to the subjects with which the user wants to share image among the tags to which check marks are not attached The control unit 150 may add the subjects corresponding to the second tags to the share targets in response to the touch input. The display unit 120 may display check marks in the second tags.

In operation S550, the first share channel may be changed to another share channel in response to the touch input on the first share channel. For example, the user may want to share images via another share channel instead of a share channel having matched a certain tag. In this case, the user may perform a touch input on the first share channel displayed on the display unit 120. In response to the user's touch input, the control unit 150 may change the displayed first share channel to another share channel. The display unit 120 may display the changed share channel as an updated first share channel.

In operation S560, the first contact may be added to or excluded from the share targets in response to a touch input on the first contact included in the contact list.

As another example, the user may want to additionally share images with at least some of the contacts that are included in the contact list and are not set as the share targets. In this case, the user may perform a touch input on the first contact with which the user wants to share image among the contacts to which check marks are not attached. The control unit 150 may add the first contact to the share targets in response to the touch input. The display unit 120 may display a check mark in the first contact.

As another example, the user may not want to share images with at least some of the contacts that are included in the contact list and are set as the share targets. In this case, the user may perform a touch input on the first contact with which the user does not want to share images among the contacts to which check marks are not attached. The control unit 150 may exclude the first contact from the share targets in response to the touch input. The display unit 120 may no longer display the check mark attached to the first contact.

In operation S570, a second share channel may be changed to another share channel in response to the touch input on the second share channel. For example, the user may want to share images via another share channel instead of a share channel having matched a certain contact. In this case, the user may perform a touch input on the second share channel displayed on the display unit 120. In response to the user's touch input, the control unit 150 may change the displayed second share channel to another share channel. The display unit 120 may display the changed share channel as an updated second share channel.

In operation S580, a third share channel may be set as or deselected from an additional share channel in response to a touch input on the third share channel included in the list of entire share channels.

For example, the user may want to additionally share images via a specific share channel, in addition to the subject corresponding to the tag and the contact included in the contact list. In this case, the user may perform a touch input on the third share channel which the user wants to use as the additional share channel in the list of the entire share channels and to which a check mark is not attached. The control unit 150 may set the third share channel as the additional share channel in response to the touch input. The display unit 120 may display a check mark in the third share channel.

As another example, the user may not want additional sharing via a specific share channel any more. In this case, the user may perform a touch input on the third share channel which the user does not want to use as the additional share channel in the list of the entire share channels and to which a check mark is attached. The control unit 150 may deselect the third share channel from the additional share channel in response to the touch input. In this case, the display unit 120 may no longer display the check mark attached to the third share channel.

In operation S590, the first image may be transmitted to the share target via the share channel corresponding to the share target and the first image may be transmitted via the additional share channel, in response to the touch input on the confirm button. The communication unit 160 may transmit the share image to the share target via the share channel corresponding to the share target in response to the touch input on the confirm button. In addition, the communication unit 160 may transmit the share image via the additional share channel.

Figure 33:
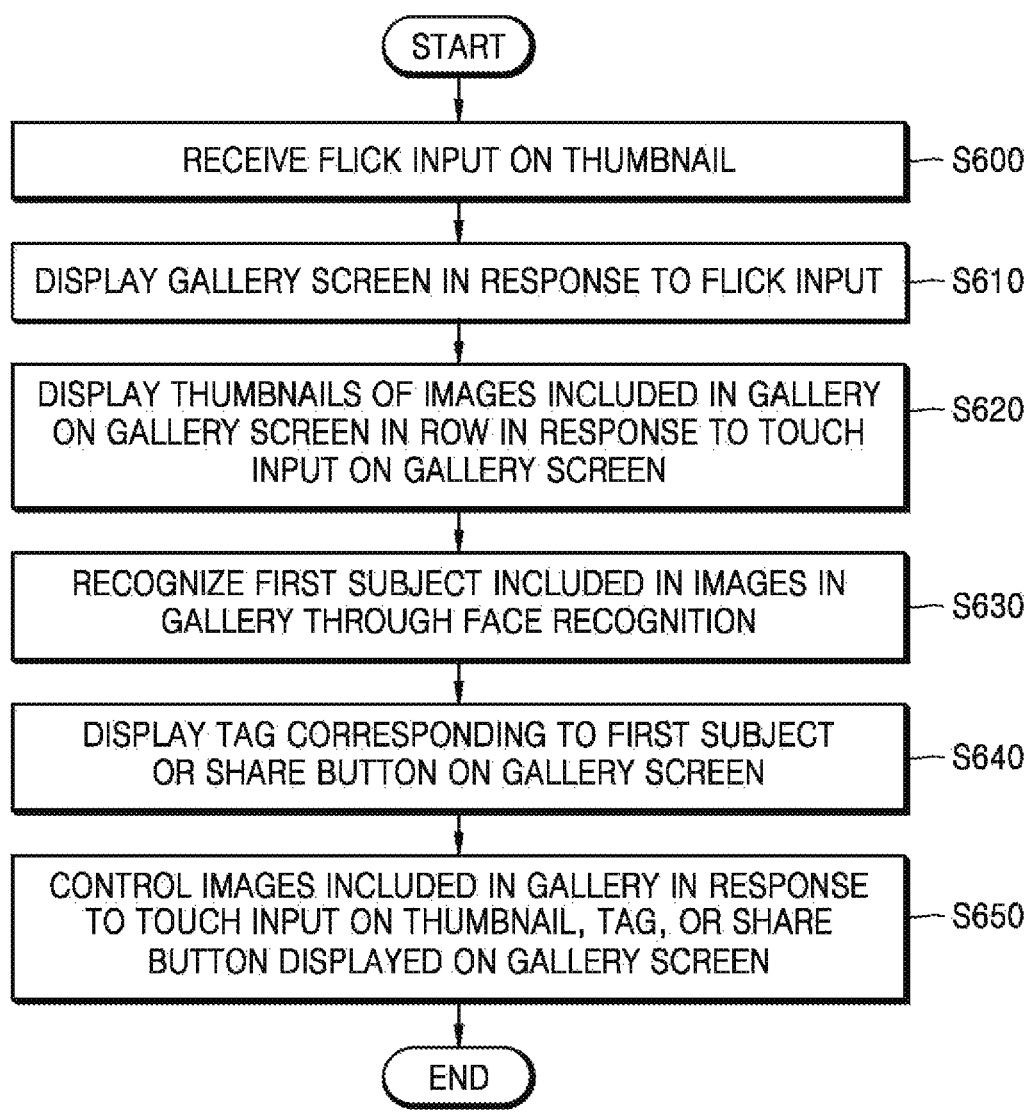
FIG. 33 is a flowchart of a process of sharing a captured image according to an embodiment of the present disclosure.

FIG. 33 is a flowchart of a process of sharing a captured image according to another embodiment of the present disclosure.

Referring to FIG. 33, in operation S600, a flick input on the thumbnail may be received in operation of sharing the captured image in response to the touch input. The input unit 130 may receive a user's flick input on the photo reel. As illustrated in FIG. 15, the input unit 130 may receive a flick-right input on one of the thumbnails included in the photo reel.

Referring to FIG. 33 again, in operation S610, a gallery screen may be displayed in response to the flick input. The display unit 120 may display the gallery screen in response to the flick input. For example, the display unit 120 may display the gallery screen as illustrated in FIG. 16.

Referring to FIG. 33 again, in operation S620, the photo reel generated by arranging the thumbnails of the images included in the gallery in a row may be displayed on the gallery screen in response to the touch input on the gallery screen. The input unit 130 may receive a user's touch input on the gallery screen. The display unit 120 may display the thumbnails of the images included in the gallery in response to the touch input. When a plurality of images are included in the gallery, a plurality of thumbnails may be displayed on the gallery screen. The photo reel may be constituted by arranging the plurality of thumbnails in a row as described above.

Figure 34:
FIG. 34 is a diagram of a screen in a case where a photo reel is displayed on a gallery screen according to an embodiment of the present disclosure.

FIG. 34 is a diagram of a screen in a case where the photo reel is displayed on the gallery screen according to an embodiment of the present disclosure.

The control unit 150 may detect the quality of the image included in the gallery. The control unit 150 may determine the quality of the image based on at least one of a degree of light exposure of the image, a resolution of the image, a focal position of the image, and a size of a subject included in the image.

For example, the control unit 150 may determine that the quality of the image is high, when the degree of light exposure of the image is appropriate, the resolution of the image is high, the focal position of the image is appropriate, and the size of the subject included in the image is appropriate. On the other hand, the control unit 150 may determine that the quality of the image is low, when the degree of light exposure of the image is excessively high or excessively low, the resolution of the image is excessively low, the focal position of the image is out of a normal range, and the size of the subject included in the image is excessively large or excessively small.

The sizes of the thumbnails in the photo reel displayed on the display unit 120 may be substantially equal to each other or different from each other. For example, as the quality of the image included in the gallery becomes higher, the thumbnail corresponding to the image may be displayed in a larger size. In addition, as the quality of the image becomes lower, the thumbnail corresponding to the image may be displayed in a smaller size. In other words, the size of the displayed thumbnail may be proportional to the quality of the image corresponding to the thumbnail.

For example, referring to FIG. 34, the thumbnail displayed at the leftmost position in the photo reel may be smaller than the thumbnail displayed at the third leftmost position. Therefore, the quality of the image corresponding to the thumbnail displayed at the leftmost position may be lower than the quality of the image corresponding to the thumbnail displayed at the third leftmost position.

On the contrary, as the quality of the image included in the gallery becomes lower, the thumbnail corresponding to the image may be displayed in a larger size. In addition, as the quality of the image becomes higher, the thumbnail corresponding to the image may be displayed in a larger size. In other words, the size of the displayed thumbnail may be inversely proportional to the quality of the image corresponding to the thumbnail.

As described above, the image display apparatus 100 may display the thumbnails corresponding to the images in different sizes according to the qualities of the images included in the gallery, thus enabling the user to confirm the qualities of the images quickly and easily. In addition, the user may intuitively confirm the qualities of the images included in the gallery.

In addition, the types of the images corresponding to the thumbnails in the photo reel, which is displayed on the display unit 120, may be substantially equal to each other or different from each other.

Referring to FIG. 33 again, in operation S630, a first subject in the image included in the gallery may be recognized through face recognition. The control unit 150 may perform the face recognition on the image included in the gallery. The control unit 150 may recognize the subject included in the image by comparing a face of the subject included in the image with a database. For example, the control unit 150 may recognize the subject included in the image within persons included in a contact list.

The control unit 150 may separately perform the face recognition on each image included in the gallery. The subject may not be included in the image, only one subject may be included in the image, or two or more subjects may be included in the image. Therefore, the number of the subjects recognized from one image through the face recognition may be an integer equal to or greater than 0. In addition, subjects included in different images may be the same person or may be different persons. Therefore, the subject recognized from one image may be identical to or different from the subject recognized from another image.

In operation S640, at least one of a tag corresponding to the first subject and a share button may be displayed on the gallery screen. The display unit 120 may display a tag corresponding to a first subject on the gallery screen. The tag corresponding to the first subject may include a name, a nickname, or a photo of the first subject. In addition, the tag may include a symbol, a mark, a word, a phrase, a logo, initials, or an icon associated with the first subject. The control unit 150 may derive a set of non-overlapped subjects among the entire subjects recognized from the entire image. The display unit 120 may display tags corresponding to the subjects included in the derived set in a row. The display unit 120 may display the tags, which are arranged in a row, alongside the photo reel.

In addition, the display unit 120 may display the share button on the gallery screen. The display unit 120 may display the share button alongside the photo reel.

For example, as illustrated in FIG. 34, the display unit 120 may display icons corresponding to the first subjects as the tags. The display unit 120 may display the tags, which are arranged in a row, and the share button alongside the photo reel.

Referring to FIG. 33 again, in operation S650, the image included in the gallery may be controlled in response to a touch input on the thumbnail, the tag, or the share button displayed on the gallery screen. The input unit 130 may receive a user's touch input on the thumbnail, the tag, or the share button. The input unit 130 may receive a tap input, a drag input, a swipe input, a slide input, a flick input, or a press-and-hold input as the touch input.

The control unit 150 may control the image contained in the gallery in response to the received touch input. For example, the control unit 150 may display the image contained in the gallery, enlarge the image, or reduce the image in response to the touch input. In addition, the control unit 150 may copy the image or delete the image in response to the received user touch input. In addition, in response to the touch input, the control unit 150 may display the thumbnails included in the photo reel as one stacked group or may merge the images into one panoramic image. In addition, in response to the touch input, the control unit 150 may transmit the image included in the gallery to the outside.

For example, the input unit 130 may receive a user's touch input on the share button displayed on the gallery screen. In response to the touch input, the display unit 120 may display, on the gallery screen, at least one of a first share channel corresponding to the tag corresponding to the first subject, a contact list, second share channels corresponding to contacts included in the contact list, a list of entire share channels, and a confirm button.

Figure 35:
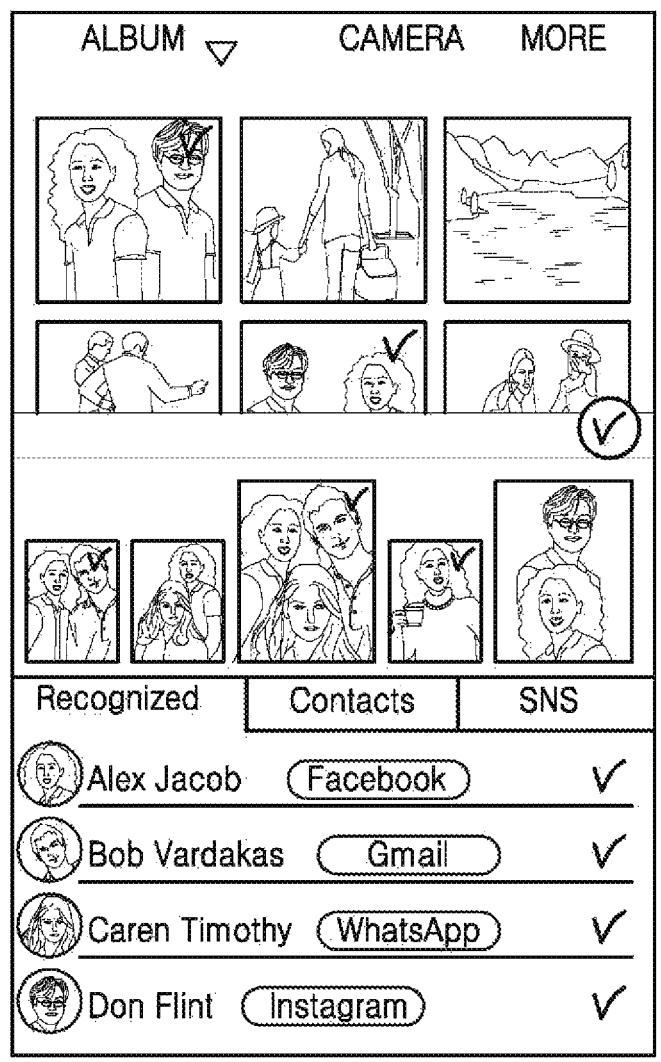
FIG. 35 is a diagram of a screen that is displayed on the image display apparatus in response to a received touch input on a share button according to an embodiment of the present disclosure.

FIG. 35 is a diagram of a screen that is displayed on the image display apparatus 100 in response to a received touch input on the share button according to another embodiment of the present disclosure.

The input unit 130 may receive a touch input on the touch button displayed on the gallery screen. The communication unit 160 may transmit the share image to the share target via the share channel corresponding to the share target in response to the touch input on the confirm button. In addition, the communication unit 160 may transmit the share image via the additional share channel.

According to the above-described various embodiments of the present disclosure, it is possible to increase user convenience when images are captured and the captured images are shared. In addition, it is possible to manage or control the captured images without switching between the camera application and the gallery application. Furthermore, the user may easily confirm the qualities of the captured images and determine whether to additionally capture an image. Moreover, the user may easily and quickly share the images with persons included in the captured image.

Various embodiments of the present disclosure may be embodied in a non-transitory storage medium including instruction codes executable by a computer, such as a program module executed by the computer. A non-transitory computer-readable medium may be any available medium which is accessible by the computer and may include any volatile/non-volatile media and any removable/non-removable media. Furthermore, the non-transitory computer-readable medium may include any computer storage and communication media. The non-transitory computer storage medium may include any volatile/non-volatile and removable/non-removable media embodied by a certain method or technology for storing information such as computer-readable instruction code, a data structure, a program module, or other data. A communication medium may be used to communicate the computer-readable instruction code, the data structure, the program module, or other data of a modulated data signal such as a carrier wave, or other transmission mechanism, and may include any information transmission medium.

It should be understood that various embodiments of the present disclosure described herein should be considered in a descriptive sense only and not for purposes of limitation. Descriptions of features or aspects within each embodiment of the present disclosure should typically be considered as available for other similar features or aspects in other various embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An image display method comprising:
    recognizing, by an image display device, a first object included in a first image, the first image being one of a newly-captured image or an image stored in a memory of the image display device;
    displaying, by the image display device, a first icon of the first object;
    receiving, by the image display device, a touch input on the first icon; and
    displaying, by the image display device, at least one thumbnail of at least one second image stored in the memory of the image display device based on the received touch input on the first icon, the at least one second image being different from the first image,
    wherein the at least one second image includes the first object corresponding to the first icon on which the touch input is received.

2. The image display method of claim 1, further comprising:
    recognizing, by the image display device, a second object included in the first image or included in the at least one thumbnail of the at least one second image;
    displaying, by the image display device, a second icon corresponding to the second object; and
    receiving, by the image display device, a touch input related to the second icon.

3. The image display method of claim 2, further comprising:
    displaying, by the image display device, at least one thumbnail of at least one third image stored in the memory of the image display device based on the received touch input related to the second icon, the at least one third image including the second object and the first object,
    when the touch input related to the second icon relates to an addition of the at least one image including the second object and the first object.

4. The image display method of claim 3, wherein an indication representing an addition of images including the second object and the first object is displayed with the second icon on the image display device.

5. The image display method of claim 4, wherein the touch input related to the second icon is received on the indication representing the addition of images including the second object and the first object.

6. The image display method of claim 2, further comprising:
    removing, from a display of the image display device, at least one thumbnail of at least one fourth image including the second object of the at least one thumbnail of at least one second image, the at least one fourth image being stored in the memory of the image display device, when the touch input related to the second icon relates to a removal of images including the second object.

7. The image display method of claim 6, wherein an indication representing the removal of the images including the second object is displayed on the display of the image display device.

8. The image display method of claim 7, wherein the touch input related to the second icon is received on the indication representing the removal of the images including the second object.

9. An image display apparatus comprising:
a camera configured to capture a group of images;
a memory configured to store the group of images;
a processor configured to recognize a first object included in a first image, the first image being one of a newly-captured image or an image stored in the memory;
a display configured to display a first icon of the first object; and
an input interface configured to receive a touch input on the first icon,
wherein the display is further configured to display at least one thumbnail of at least one second image stored in the memory based on the received touch input on the first icon, the at least one second image being different from the first image, and
wherein the at least one second image includes the first object corresponding to the first icon on which the touch input is received.

10. The image display apparatus of claim 9,
wherein the processor is further configured to recognize a second object included in the first image or included in the at least one thumbnail of the at least one second image,
wherein the display is further configured to display a second icon corresponding to the second object, and
wherein the input interface is further configured to receive a touch input related to the second icon.

11. The image display apparatus of claim 10,
wherein the display is further configured to display at least one thumbnail of at least one third image stored in the memory based on the received touch input related to the second icon, the at least one third image including the second object and the first object,
when the touch input related to the second icon relates to an addition of images including the second object and the first object.

12. The image display apparatus of claim 11, wherein the display is further configured to display an indication representing the addition of images including the second object and the first object.

13. The image display apparatus of claim 12, wherein the touch input related to the second icon is received on the indication representing the addition of images including the second object and the first object.

14. The image display apparatus of claim 11,
wherein the display is further configured to remove at least one thumbnail of at least one fourth image including the second object of the at least one thumbnail of at least one second image, the at least one fourth image being stored in the memory,
when the touch input related to the second icon relates to a removal of images including the second object.

15. The image display apparatus of claim 14, wherein the display is further configured to display an indication representing the removal of the images including the second object.

16. The image display apparatus of claim 15, wherein the touch input related to the second icon is received on the indication representing the removal of the images including the second object.

* * * * *